US012562810B2

(12) United States Patent
Ji et al.

(10) Patent No.: US 12,562,810 B2
(45) Date of Patent: Feb. 24, 2026

(54) DIRECT NTN COMMUNICATION

(71) Applicant: QUALCOMM Incorporated, San Diego, CA (US)

(72) Inventors: Lianghai Ji, San Diego, CA (US); Jun Ma, San Diego, CA (US); Mohamad Sayed Hassan, Paris (FR)

(73) Assignee: QUALCOMM Incorporated, San Diego, CA (US)

( * ) Notice: Subject to any disclaimer, the term of this patent is extended or adjusted under 35 U.S.C. 154(b) by 291 days.

(21) Appl. No.: 18/327,015

(22) Filed: May 31, 2023

(65) Prior Publication Data

US 2024/0405857 A1     Dec. 5, 2024

(51) Int. Cl.
H04B 7/185        (2006.01)
H04W 84/06        (2009.01)

(52) U.S. Cl.
CPC ..... H04B 7/18539 (2013.01); H04B 7/18545 (2013.01); H04W 84/06 (2013.01)

(58) Field of Classification Search
CPC ........... H04B 7/18539; H04B 7/18545; H04W 84/06
See application file for complete search history.

(56) References Cited

U.S. PATENT DOCUMENTS

| | | | | |
|---|---|---|---|---|
| 2021/0119861 A1* | 4/2021 | Tripathi | ............ | H04W 56/0045 |
| 2022/0248286 A1* | 8/2022 | Sedin | .............. | H04W 36/00835 |
| 2022/0361182 A1* | 11/2022 | Medina | ............... | H04W 72/542 |
| 2023/0254851 A1* | 8/2023 | Prasad | .............. | H04W 72/1268 |
| | | | | 370/316 |

| | | | | |
|---|---|---|---|---|
| 2023/0344508 A1* | 10/2023 | Tseng | ................. | H04W 56/005 |
| 2024/0031009 A1* | 1/2024 | Zhang | ................ | H04B 7/18502 |
| 2024/0049336 A1* | 2/2024 | Shrestha | ............... | H04W 76/27 |
| 2024/0340980 A1* | 10/2024 | Ji | .......................... | H04W 76/10 |
| 2025/0031199 A1* | 1/2025 | Park | .................... | H04W 72/115 |

FOREIGN PATENT DOCUMENTS

WO        2024210989 A1    10/2024

OTHER PUBLICATIONS

International Search Report and Written Opinion—PCT/US2024/029718—ISA/EPO—Sep. 17, 2025.
Rinaldi F., et al., "Non-Terrestrial Networks in 5G & Beyond: A Survey", IEEE Access, IEEE, USA, vol. 8, Sep. 10, 2020, pp. 165178-165200, XP011809890, abstract, sections III, V.

\* cited by examiner

*Primary Examiner* — Alpus Hsu
(74) *Attorney, Agent, or Firm* — Procopio, Cory, Hargreaves & Savitch LLP

(57)        ABSTRACT

Method and apparatus for direct NIN communication. The apparatus receives, from a network entity, an indication indicating support for a direct NTN communication. The direct NTN communication between the first UE and at least a second UE bypasses ground-based feeder links. The apparatus transmits, to the network entity, a communication request for the direct NTN communication with at least the second UE based on the indication indicating support for the direct NTN communication. The communication request is transmitted to the second UE via the direct NTN communication. The apparatus receives, from the second UE, a communication request feedback message indicating that the second UE is reachable over the direct NTN communication. The communication request feedback message is received from the second UE via the direct NTN communication.

28 Claims, 20 Drawing Sheets

1500

1502
receive, from a network entity, an indication indicating support for a direct NTN communication, wherein the direct NTN communication between the first UE and at least a second UE bypasses ground-based feeder links 1504
transmit, to the network entity, a communication request for the direct NTN communication with at least the second UE based on the indication indicating the support for the direct NTN communication, wherein the communication request is transmitted to at least the second UE via the direct NTN communication

600

602

612

620

602        624        622

ISL

626

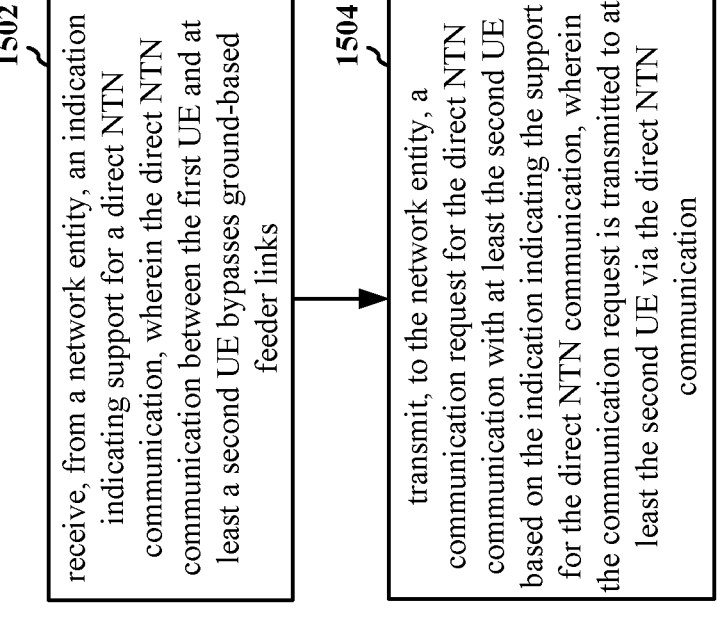

1502 receive, from a network entity, an indication indicating support for a direct NTN communication, wherein the direct NTN communication between the first UE and at least a second UE bypasses ground-based feeder links

1504 transmit, to the network entity, a communication request for the direct NTN communication with at least the second UE based on the indication indicating the support for the direct NTN communication, wherein the communication request is transmitted to at least the second UE via the direct NTN communication

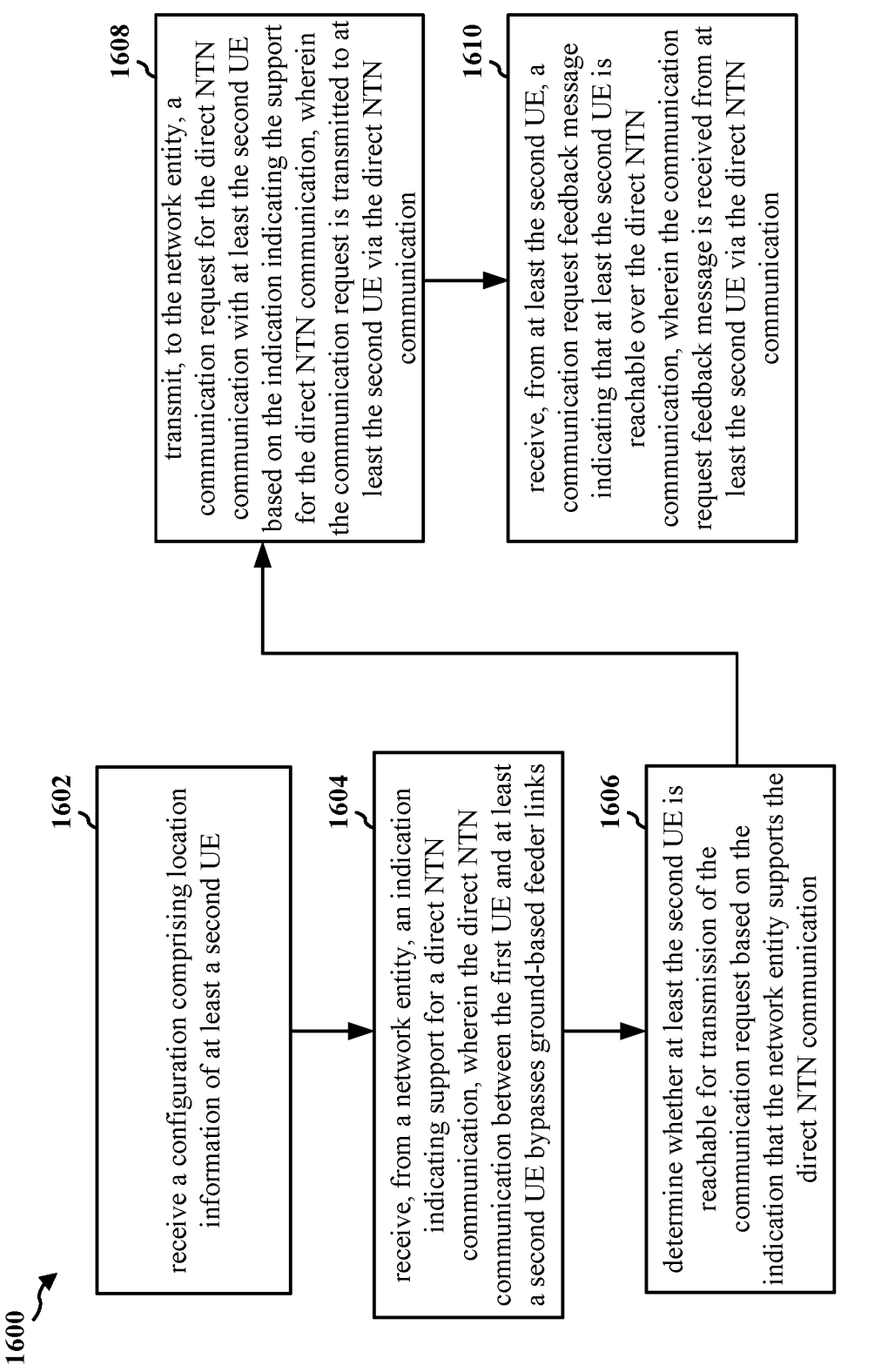

1600

1602 receive a configuration comprising location information of at least a second UE

1604 receive, from a network entity, an indication indicating support for a direct NTN communication, wherein the direct NTN communication between the first UE and at least a second UE bypasses ground-based feeder links

1606 determine whether at least the second UE is reachable for transmission of the communication request based on the indication that the network entity supports the direct NTN communication

1608 transmit, to the network entity, a communication request for the direct NTN communication with at least the second UE based on the indication indicating the support for the direct NTN communication, wherein the communication request is transmitted to at least the second UE via the direct NTN communication

1610 receive, from at least the second UE, a communication request feedback message indicating that at least the second UE is reachable over the direct NTN communication, wherein the communication request feedback message is received from at least the second UE via the direct NTN communication

FIG. 16

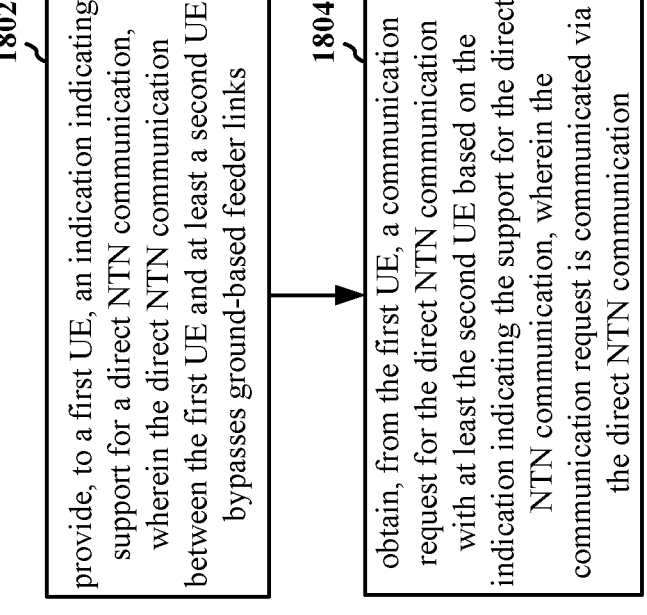

1802
provide, to a first UE, an indication indicating support for a direct NTN communication, wherein the direct NTN communication between the first UE and at least a second UE bypasses ground-based feeder links 1804
obtain, from the first UE, a communication request for the direct NTN communication with at least the second UE based on the indication indicating the support for the direct NTN communication, wherein the communication request is communicated via the direct NTN communication

DIRECT NTN COMMUNICATION

TECHNICAL FIELD

The present disclosure relates generally to communication systems, and more particularly, to a configuration for an initial end-to-end discovery procedure in direct non-terrestrial networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus receives, from a network entity, an indication indicating support for a direct non-terrestrial network (NTN) communication, wherein the direct NTN communication between the first UE and at least a second UE bypasses ground-based feeder links. The apparatus transmits, to the network entity, a communication request for the direct NTN communication with at least the second UE based on the indication indicating the support for the direct NTN communication, wherein the communication request is transmitted to at least the second UE via the direct NTN communication.

In an aspect of the disclosure, a method, a computer-readable medium, and an apparatus are provided. The apparatus may be a device at a network node. The device may be a processor and/or a modem at a network node or the network node itself. The apparatus provides, to a first user equipment (UE), an indication indicating support for a direct non-terrestrial network (NTN) communication, wherein the direct NTN communication between the first UE and at least a second UE bypasses ground-based feeder links. The apparatus obtains, from the first UE, a communication request for the direct NTN communication with at least the second UE based on the indication indicating the support for the direct NTN communication, wherein the communication request is communicated via the direct NTN communication.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 15 is a flowchart of a method of wireless communication.

FIG. 16 is a flowchart of a method of wireless communication.

FIG. 18 is a flowchart of a method of wireless communication.

DETAILED DESCRIPTION

Figure 1:
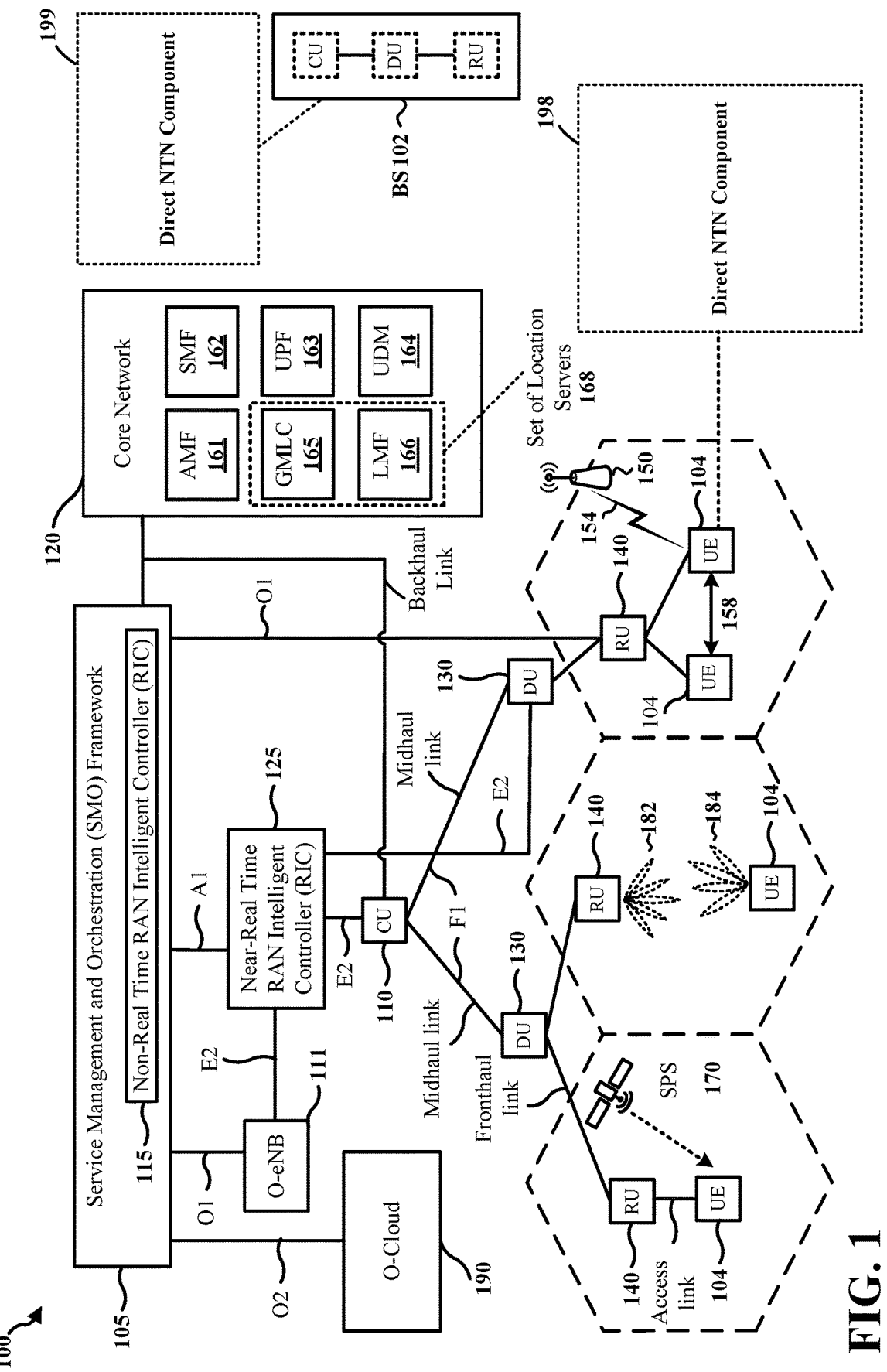
FIG. 1 is a diagram illustrating an example of a wireless communications system and an access network.

In addition to, or as an alternative to a terrestrial network (TN), wireless communication systems, such as a non-terrestrial network (NTN), provide additional network coverage. As an example, an NTN can be provided in regions where TNs are unavailable or have limited coverage. NTNs may also be used for wireless communication in instances where TNs are damaged or non-operational due to inclement weather, natural disasters, or other reasons. NTNs may be deployed in mixed deployment configurations (e.g., TN+NTN) to handle wireless traffic, even in areas in which a TN is available. The TN+NTN mixed deployment configuration may reduce traffic congestion, improve reachability of a network, and improve user traffic handling capability.

NTN may have a large coverage area such that NTN may be able to provide coverage to at least two communicating UEs having a high probability. Two NTN nodes having an ISL between each other may be used to further enlarge the coverage area of the direct NTN communication. Direct NTN communication between UEs without going through feeder link or ground network may reduce latency and/or load on the feeder, while enabling communication in the event of a feeder link coverage hole. An NTN node may be equipped with a function/hardware for maintaining and updating a database of all the reachable UEs for direct NTN communication. In such instances, the NTN node may determine that some UEs are reachable within a coverage area, while some UEs may not be reachable due to some UEs being beyond the coverage area. Since NTN node (e.g., aerial devices, satellites) are mobile and may move quickly, a UE may frequently update the database (e.g., a reachable UE may become non-reachable or vice versa), regardless if the UE will be reached or contacted by another UE, which may result in consuming resources and increasing the complexity of the system.

Aspects presented herein provide a configuration for an initial end-to-end discovery procedure in direct NTN communication. The aspects presented herein may allow a UE to determine if an intended communication peer UE is reachable over a direct NTN communication. For example, a UE may receive an indication from a network entity that the direct NTN communication is supported such that communication between the UE and the intended communication peer UE may bypass ground-based feeder links.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration.

The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHZ), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a sub- scriber unit, a wireless unit, a remote unit, a mobile device, a wireless device, a wireless communications device, a remote device, a mobile subscriber station, an access termi- nal, a mobile terminal, a wireless terminal, a remote termi- nal, a handset, a user agent, a mobile client, a client, or some other suitable terminology. In some scenarios, the term UE may also apply to one or more companion devices such as in a device constellation arrangement. One or more of these devices may collectively access the network and/or indi- vidually access the network.

Referring again to FIG. 1, in certain aspects, the UE 104 may comprise a direct NTN component 198 that may be configured to receive, from a network entity, an indication indicating support for a direct NTN communication, wherein the direct NTN communication between the first UE and at least a second UE bypasses ground-based feeder links; and transmit, to the network entity, a communication request for the direct NTN communication with at least the second UE based on the indication indicating the support for the direct NTN communication, wherein the communication request is transmitted to at least the second UE via the direct NTN communication.

Referring again to FIG. 1, in certain aspects, the base station 102 may comprise a direct NTN component 199 that may be configured to provide, to a first UE, an indication indicating support for a direct NTN communication, wherein the direct NTN communication between the first UE and at least a second UE bypasses ground-based feeder links; and obtain, from the first UE, a communication request for the direct NTN communication with at least the second UE based on the indication indicating the support for the direct NTN communication, wherein the communication request is communicated via the direct NTN communica- tion.

Although the following description may be focused on 5G NR, the concepts described herein may be applicable to other similar areas, such as LTE, LTE-A, CDMA, GSM, and other wireless technologies.

Figures 2A, 2B, 2C, 2D:
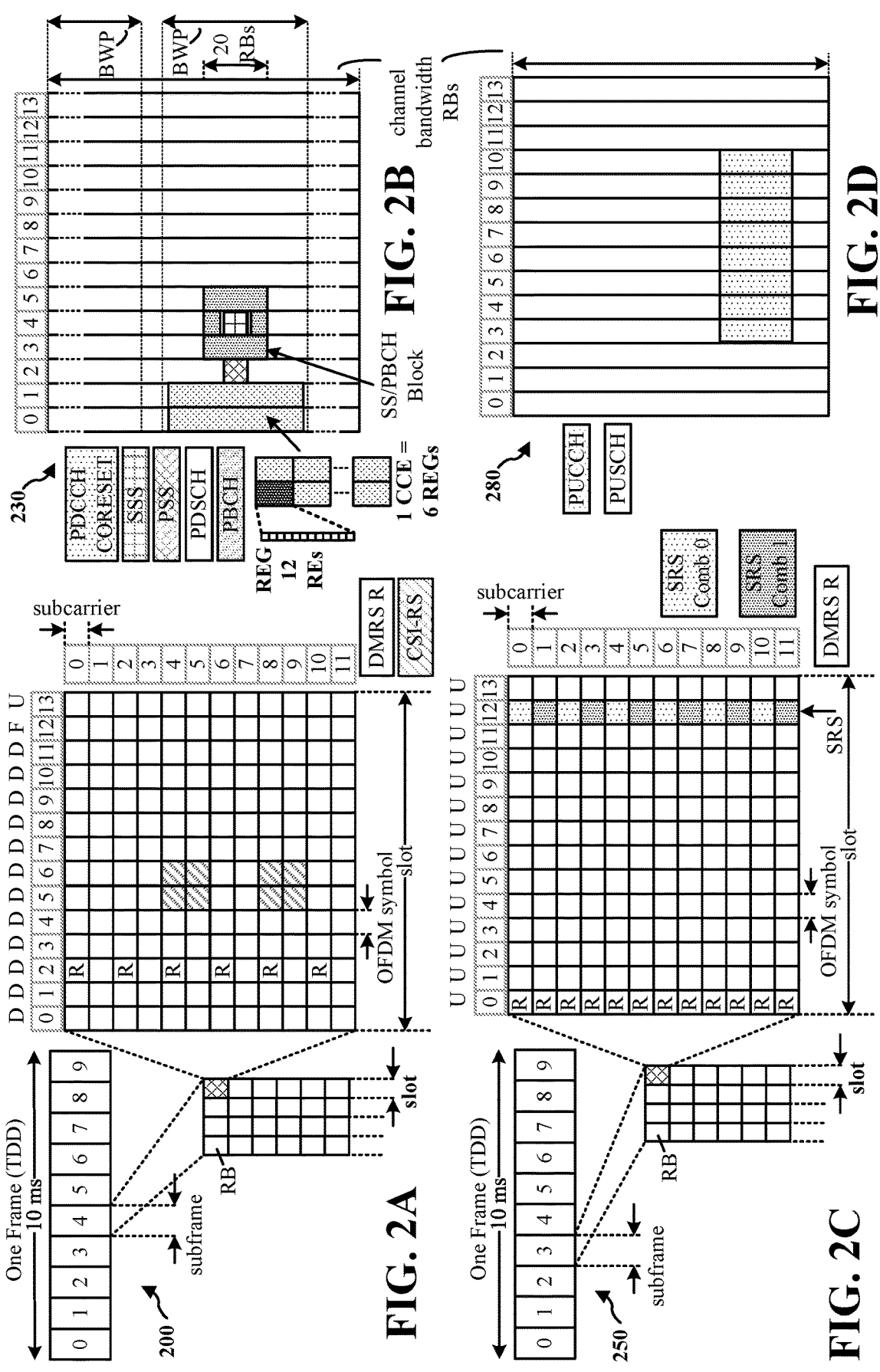
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the descrip- tion infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depend- ing on whether the cyclic prefix (CP) is normal or extended. For normal CP, each slot may include 14 symbols, and for extended CP, each slot may include 12 symbols. The sym- bols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited sce- narios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS $\Delta f = 2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numer- ology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multi- plexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits car- ried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
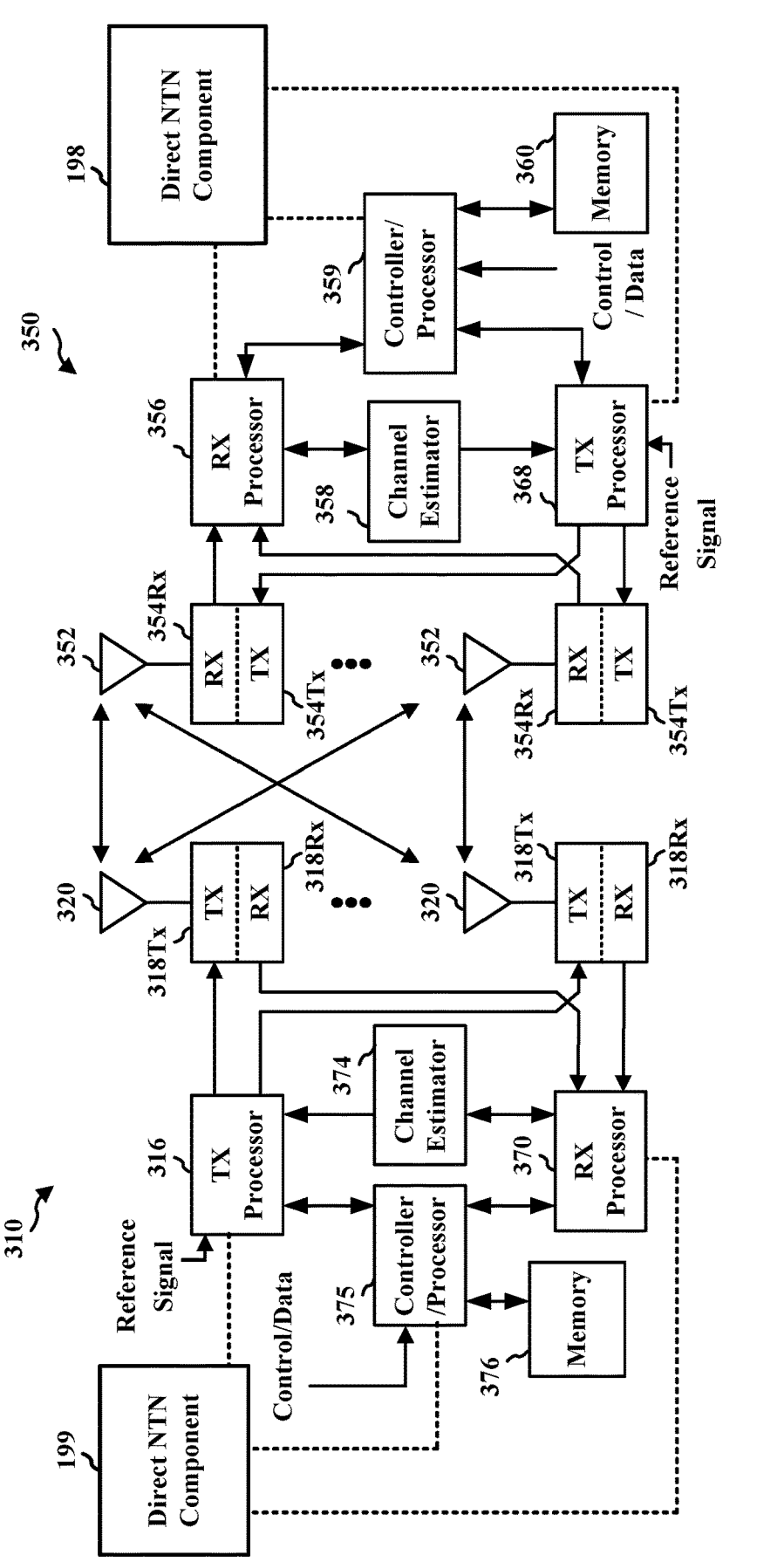
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the direct NTN component 198 of FIG. 1.

At least one of the TX processor 316, the RX processor 370, and the controller/processor 375 may be configured to perform aspects in connection with the direct NTN component 199 of FIG. 1.

As described above, wireless communication systems, such as a NTN, have been introduced to provide ubiquitous network coverage, especially in regions where TNs are unavailable or poor. NTNs may also be used in instances where TNs are damaged or non-operational due to inclement weather, natural disasters, or other reasons. NTNs may be deployed in a mixed deployment configuration (e.g., TN+NTN) to handle traffic, even in TN availability areas. The TN+NTN mixed deployment configuration may reduce traffic congestion, enhance reachability of network, and enhance user traffic handling capability.

Figure 4:
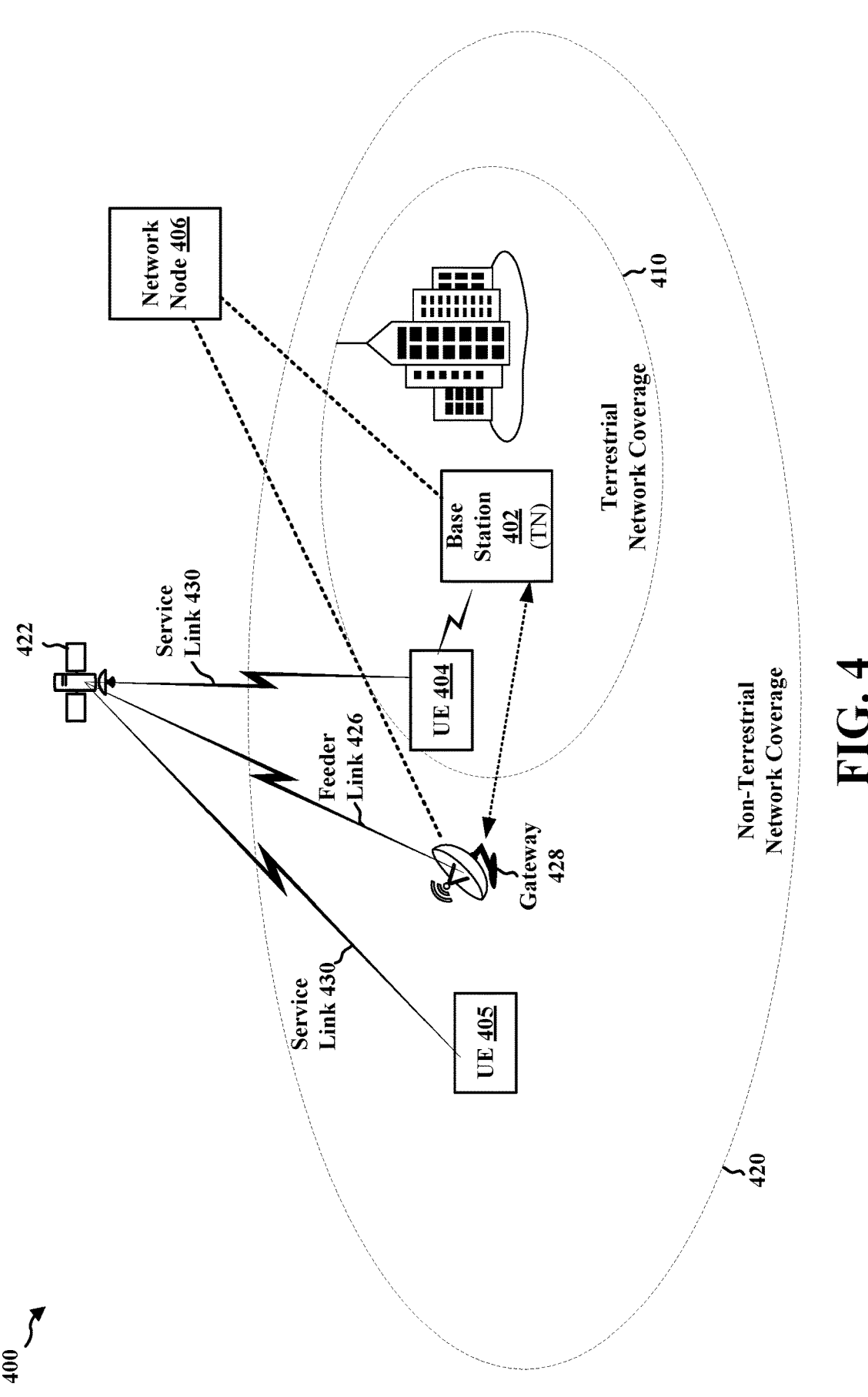
FIG. 4 is a diagram illustrating an example environment that may support wireless communication including aspects of a terrestrial network and a non-terrestrial network (NTN).

FIG. 4 is a diagram illustrating an example environment 400 that may support wireless communication including aspects of a TN and NTN, as presented herein. To enable communication with a UE, a number of approaches may be utilized.

In some examples, a UE may communicate with a terrestrial network. In the illustrated example of FIG. 4, a TN includes a base station 402 that provides coverage to UEs, such as an example UE 404, located within a coverage area 410 for the TN. The base station 402 may facilitate communication between the UE 404 and a network node 406. Aspects of the network node 406 may be implemented by a core network, such as the example core network 190 of FIG. 1.

In some examples, a UE may transmit or receive communication via a NTN. As an example, the UE may transmit or receive satellite-based communication (e.g., via an Iridium-like satellite communication system or a satellite-based 3GPP NTN). For example, an aerial device 422 may provide coverage to one or more UEs, such as an example UE 404 or UE 405, located within a coverage area 420 for the aerial device 422. In some examples, the aerial device 422 may communicate with the network node 406 through a feeder link 426 established between the aerial device 422 and a gateway 428 in order to provide service to the UE 404 or UE 405 within the coverage area 420 of the aerial device 422 via a service link 430. In some instances, the UE 404 may be within the coverage area 420 and/or the coverage area 410, while the UE 405 may be within the coverage area 420 but beyond the coverage area 410. The feeder link 426 may include a wireless link between the aerial device 422 and the gateway 428. The service link 430 may include a wireless link between the aerial device 422 and the UE 404 or the UE 405. In some examples, the gateway 428 may communicate directly with the network node 406. In some examples, the gateway 428 may communicate with the network node 406 via the base station 402.

In some aspects, the aerial device 422 may be configured to communicate directly with the gateway 428 via the feeder link 426. The feeder link 426 may include a radio link that provides wireless communication between the aerial device 422 and the gateway 428.

In some aspects, the aerial device 422 may communicate with the gateway 428 via one or more other aerial devices. For example, the aerial device 422 and a second aerial device (not shown) may be part of a constellation of satellites (e.g., aerial devices) that communicate via inter-satellite links (ISLs). For example, the aerial device 422 may establish an ISL with the second aerial device. The ISL may be a radio interface or an optical interface and operate in the RF frequency or optical bands, respectively. The second aerial device may communicate with the gateway 428 via a second feeder link, similarly as the aerial device 422 communicates with the gateway 428.

In some examples, the aerial device 422 and/or the second aerial device may include an aerial device, such as, but not limited to, an unmanned aircraft system (UAS), a balloon, a drone, an unmanned aerial vehicle (UAV), or the like. Examples of a UAS platform that may be used for NTN communication include systems including Tethered UAS (TUA), Lighter Than Air UAS (LTA), Heavier Than Air UAS (HTA), and High Altitude Platforms (HAPs). In some examples, the aerial device 422 and/or the second aerial device may include a satellite or a space-borne vehicle placed into Low-Earth Orbit (LEO), Medium-Earth Orbit (MEO), Geostationary Earth Orbit (GEO), or High Elliptical Orbit (HEO).

In some aspects, the aerial device 422 and/or the second aerial device may implement a transparent payload (sometimes referred to as a "bent pipe" payload). For example, after receiving a signal, a transparent aerial device may have the ability to change the frequency carrier of the signal, perform RF filtering on the signal, and amplify the signal before outputting the signal. In such aspects, the signal output by the transparent aerial device may be a repeated signal in which the waveform of the output signal is unchanged relative to the received signal.

In other aspects, the aerial device 422 and/or the second aerial device may implement a regenerative payload. For example, a regenerative aerial device may have the ability to perform all of or part of the base station functions, such as transforming and amplifying a received signal via on-board processing before outputting a signal. In some such aspects, transformation of the received signal may refer to digital processing that may include demodulation, decoding, switching and/or routing, re-encoding, re-modulation, and/or filtering of the received signal.

In examples in which the aerial device implements a transparent payload, the transparent aerial device may communicate with the base station 402 via the gateway 428. In some such examples, the base station 402 may facilitate communication between the gateway 428 and the network node 406. In examples in which the aerial device implements a regenerative payload, the regenerative aerial device may have an on-board base station. In some such examples, the on-board base station may communicate with the network node 406 via the gateway 428. In some examples, the on-board base station may include a DU and a CU, as shown for example in BS 102 of FIG. 1. In some examples, the on-board base station may include a DU that is in communication with a corresponding CU that is on the ground.

Figures 5A, 5B, 5C:
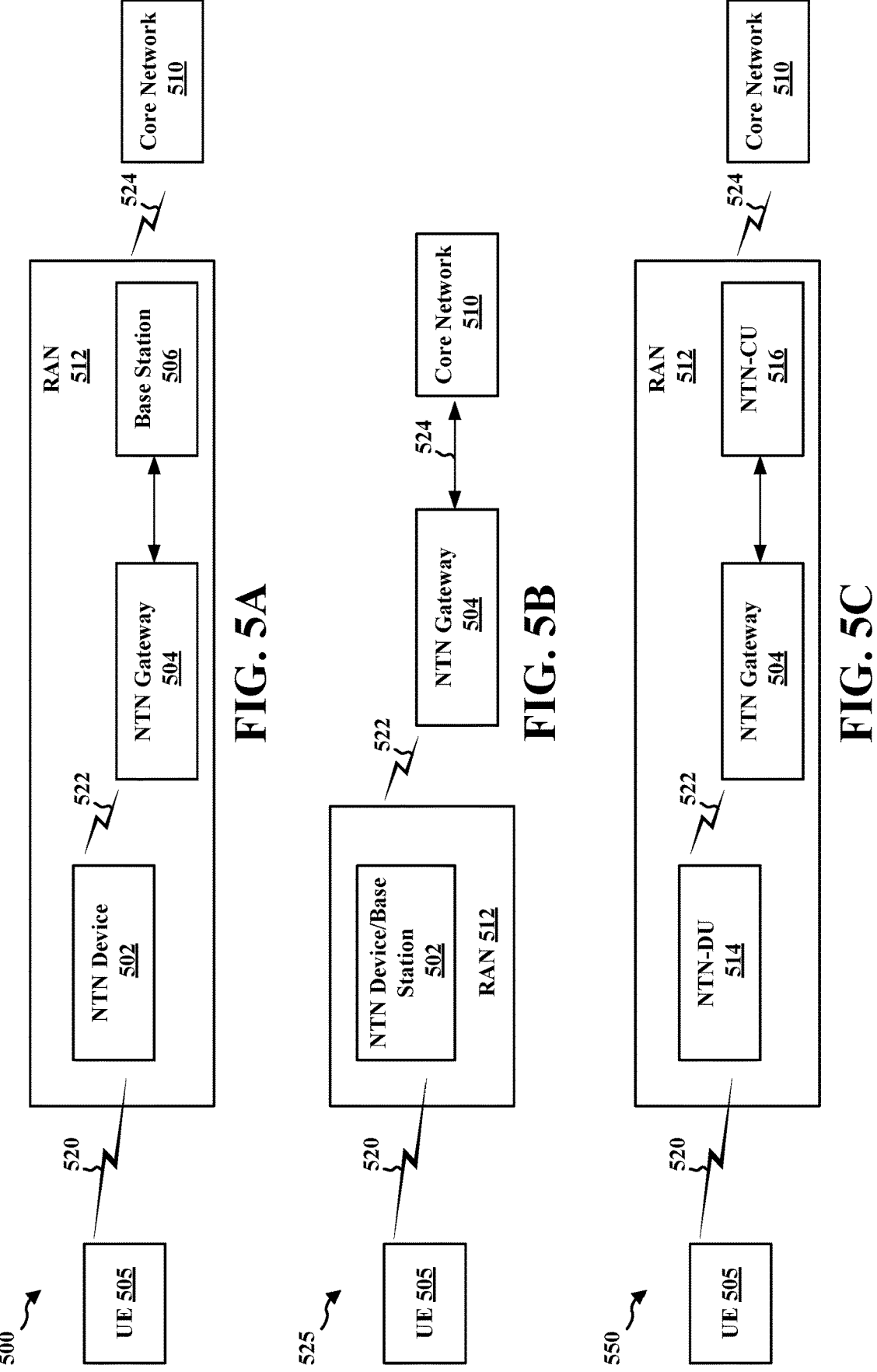
FIGS. 5A, 5B, and 5C illustrate example aspects of a network architecture that supports communication via an NTN device.

FIG. 5A illustrates an example network architecture 500 capable of supporting NTN access, e.g., using 5G NR, as presented herein. Although the aspects are described using the example of 5G NR, the concepts presented herein may also be applied for other types of core networks. FIG. 5A illustrates a network architecture with transparent payloads. While aspects of FIG. 5A illustrate a 5G-based network, similar network implementations and configurations may be used for other communication technologies, such as 3G, 4G LTE, etc.

The network architecture 500 of FIG. 5A includes a UE 505, an NTN device 502, an NTN gateway 504 (sometimes referred to as "gateways," "earth stations," or "ground stations"), and a base station 506 having the capability to communicate with the UE 505 via the NTN device 502. The NTN device 502, the NTN gateway 504, and the base station 506 may be part of a RAN 512 (e.g., an NG RAN).

The base station 506 may be a network node that corresponds to the base station 310 of FIG. 3. The network architecture 500 is illustrated as further including a core network 510. In some aspects, the core network 510 may include a number of Fifth Generation (5G) networks including 5G Core Networks (5GCNs) and may correspond to the core network 120 described in connection with FIG. 1. The core network 510 may be public land mobile networks (PLMN). In some aspects, the core network may be 5GCNs.

Permitted connections in the network architecture 500 with transparent payloads illustrated in FIG. 5A, allow the base station 506 to access the NTN gateway 504 and the core network 510. In some examples, the base station 506 may be shared by multiple PLMNs. Similarly, the NTN gateway 504 may be shared by more than one base station.

FIG. 5A provides a generalized illustration of various components, any or all of which may be utilized as appropriate, and each of which may be duplicated or omitted, as necessary. Specifically, although the example of FIG. 5A includes one UE 505, it should be understood that many UEs (e.g., hundreds, thousands, millions, etc.) may utilize the network architecture 500. Similarly, the network architecture 500 may include a larger (or smaller) number of NTN devices, NTN gateways, base stations, RAN, core networks, and/or other components. The illustrated connections that connect the various components in the network architecture 500 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 505 is configured to communicate with the core network 510 via the NTN device 502, the NTN gateway 504, and the base station 506. As illustrated by the RAN 512, one or more RANs associated with the core network 510 may include one or more base stations. Access to the network may be provided to the UE 505 via wireless communication between the UE 505 and the base station 506 (e.g., a serving base station), via the NTN device 502 and the NTN gateway 504. The base station 506 may provide wireless communications access to the core network 510 on behalf of the UE 505, e.g., using 5G NR.

The base station 506 may be referred to by other names such as a gNB, a "satellite node", a satellite NodeB (sNB), "satellite access node", etc. The base station 506 may not be the same as terrestrial network gNBs, but may be based on a terrestrial network gNB with additional capability. For example, the base station 506 may terminate the radio interface and associated radio interface protocols to the UE 505 and may transmit DL signals to the UE 505 and receive UL signals from the UE 505 via the NTN device 502 and the NTN gateway 504. The base station 506 may also support signaling connections and voice and data bearers to the UE 505 and may support handover of the UE 505 between different radio cells for the NTN device 502, between different NTN devices and/or between different base stations. The base station 506 may be configured to manage moving radio beams (e.g., for airborne vehicles and/or non-geostationary (non-GEO) devices) and associated mobility of the UE 505. The base station 506 may assist in the handover (or transfer) of the NTN device 502 between different NTN gateways or different base stations. In some examples, the base station 506 may be separate from the NTN gateway 504, e.g., as illustrated in the example of FIG. 5A. In other examples, the base station 506 may include or may be combined with one or more NTN gateways, e.g., using a split architecture. For example, with a split architecture, the base station 506 may include a Central Unit (CU), such as the example CU of BS 102 of FIG. 1, and the NTN gateway 504 may include or act as Distributed Unit (DU), such as the example DU of BS 102 of FIG. 1. The base station 506 may be fixed on the ground with transparent payload operation. In one implementation, the base station 506 may be physically combined with, or physically connected to, the NTN gateway 504 to reduce complexity and cost.

The NTN gateway 504 may be shared by more than one base station and may communicate with the UE 505 via the NTN device 502. The NTN gateway 504 may be dedicated to one associated constellation of NTN devices. The NTN gateway 504 may be included within the base station 506, e.g., as a base station-DU within the base station 506. The NTN gateway 504 may communicate with the NTN device 502 using control and user plane protocols. The control and user plane protocols between the NTN gateway 504 and the NTN device 502 may: (i) establish and release the NTN gateway 504 to the NTN device 502 communication links, including authentication and ciphering; (ii) update NTN device software and firmware; (iii) perform NTN device Operations and Maintenance (O&M); (iv) control radio beams (e.g., direction, power, on/off status) and mapping between radio beams and NTN gateway UL and DL payload; and/or (v) assist with handoff of the NTN device 502 or radio cell to another NTN gateway.

Support of transparent payloads with the network architecture 500 shown in FIG. 5A may impact the communication system as follows. The core network 510 may treat a satellite RAT as a new type of RAT with longer delay, reduced bandwidth and/or higher error rate. Consequently, there may be some impact to PDU session establishment and mobility management (MM) and connection management (CM) procedures. The NTN device 502 may be shared with other services (e.g., satellite television, fixed Internet access) with 5G NR mobile access for UEs added in a transparent manner. This may enable legacy NTN devices to be used and may avoid the need to deploy a new type of NTN device. The base station 506 may assist assignment and transfer of the NTN device 502 and radio cells between the base station 506 and the NTN gateway 504 and support handover of the UE 505 between radio cells, NTN devices, and other base stations. Thus, the base station 506 may differ from a terrestrial network gNB. Additionally, a coverage area of the base station 506 may be much larger than the coverage area of a terrestrial network base station.

In the illustrated example of FIG. 5A, a service link 520 may facilitate communication between the UE 505 and the NTN device 502, a feeder link 522 may facilitate communication between the NTN device 502 and the NTN gateway 504, and an interface 524 may facilitate communication between the base station 506 and the core network 510. The service link 520 and the feeder link 522 may be implemented by a same radio interface (e.g., the NR-Uu interface). The interface 524 may be implemented by the NG interface.

FIG. 5B shows a diagram of a network architecture 525 capable of supporting NTN access, e.g., using 5G NR, as presented herein. The network architecture 525 shown in FIG. 5B is similar to that shown in FIG. 5A, like designated elements being similar or the same. FIG. 5B, however, illustrates a network architecture with regenerative payloads, as opposed to transparent payloads shown in FIG. 5A. A regenerative payload, unlike a transparent payload, includes an on-board base station (e.g., includes the functional capability of a base station), and is referred to herein as an NTN device 502/base station. The on-board base station may be a network node that corresponds to the base station 310 in FIG. 3. The RAN 512 is illustrated as including the NTN device 502/base station. Reference to the NTN device 502/base station may refer to functions related to communication with the UE 505 and the core network 510 and/or to functions related to communication with the NTN gateway 504 and with the UE 505 at a physical radio frequency level.

An on-board base station may perform many of the same functions as the base station 506 as described previously. For example, the NTN device 502/base station may terminate the radio interface and associated radio interface protocols to the UE 505 and may transmit DL signals to the UE 505 and receive UL signals from the UE 505, which may include encoding and modulation of transmitted signals and demodulation and decoding of received signals. The NTN device 502/base station may also support signaling connections and voice and data bearers to the UE 505 and may support handover of the UE 505 between different radio cells for the NTN device 502/base station and between or among different NTN device/base stations. The NTN device 502/base station may assist in the handover (or transfer) of the UE 505 between different NTN gateways and different control networks. The NTN device 502/base station may hide or obscure specific aspects of the NTN device 502/base station from the core network 510, e.g., by interfacing to the core network 510 in the same way or in a similar way to a terrestrial network base station. The NTN device 502/base station may further assist in sharing of the NTN device 502/base station. The NTN device 502/base station may communicate with one or more NTN gateways and with one or more core networks via the NTN gateway 504. In some aspects, the NTN device 502/base station may communicate directly with other NTN device/base stations using Inter-Satellite Links (ISLs), which may support an Xn interface between any pair of NTN device/base stations.

With low Earth orbit (LEO) devices, the NTN device 502/base station may manage moving radio cells with coverage at different times. The NTN gateway 504 may be connected directly to the core network 510, as illustrated. The NTN gateway 504 may be shared by multiple core networks, for example, if NTN gateways are limited. In some examples the core network 510 may be aware of coverage area(s) of the NTN device 502/base station in order to page the UE 505 and to manage handover. Thus, as can be seen, the network architecture 525 with regenerative payloads may have more impact and complexity with respect to both the NTN device 502/base station and the core network 510 than the network architecture 500 including transparent payloads, as shown in FIG. 5A.

Support of regenerative payloads with the network architecture 525 shown in FIG. 5B may impact the network architecture 525 as follows. The core network 510 may be impacted if fixed tracking areas and fixed cells are not supported, because core components of mobility management and regulatory services, which are based on fixed cells and fixed tracking areas for terrestrial PLMNs, may be replaced by a new system (e.g., based on a location of the UE 505). If fixed tracking areas and fixed cells are supported, the core network 510 may map any fixed tracking area to one or more NTN device/base stations with current radio coverage of the fixed tracking area when performing paging of the UE 505 that is located in this fixed tracking area. This could include configuration in the core network 510 of long term orbital data for the NTN device 502/base station (e.g., obtained from an operator of the NTN device 502/base station) and could add significant new impact to core network 510.

In the illustrated example of FIG. 5B, a service link 520 may facilitate communication between the UE 505 and the NTN device 502/base station, a feeder link 522 may facilitate communication between the NTN device 502/base station and the NTN gateway 504, and an interface 524 may facilitate communication between the NTN gateway 504 and the core network 510. The service link 520 may be implemented by the NR-Uu interface. The feeder link 522 may be implemented by the NG interface over SRI. The interface 524 may be implemented by the NG interface.

FIG. 5C shows a diagram of a network architecture 550 capable of supporting NTN access, e.g., using 5G NR, as presented herein. The network architecture shown in FIG. 5C is similar to that shown in FIGS. 5A and 5B, like designated elements being similar or the same. FIG. 5C, however, illustrates a network architecture with regenerative payloads, as opposed to transparent payloads, as shown in FIG. 5A, and with a split architecture for the base station. For example, the base station may be split between a Central Unit (CU), such as the CU of BS 102 of FIG. 1, and a Distributed Unit (DU), such as the DU of BS 102 of FIG. 1. In the illustrated example of FIG. 5C, the network architecture 550 includes an NTN-CU 516, which may be a ground-based base station or a terrestrial base station. The regenerative payloads include an on-board base station DU, and is referred to herein as an NTN-DU 514. The NTN-CU 516 and the NTN-DU 514, collectively or individually, may correspond to the network node associated with the base station 310 in FIG. 3.

The NTN-DU 514 communicates with the NTN-CU 516 via the NTN gateway 504. The NTN-CU 516 together with the NTN-DU 514 perform functions, and may use internal communication protocols, which are similar to or the same as a gNB with a split architecture. In the example, the NTN-DU 514 may correspond to and perform functions similar to or the same as a gNB Distributed Unit (gNB-DU), while the NTN-CU 516 may correspond to and perform functions similar to or the same as a gNB Central Unit (gNB-CU). However, the NTN-CU 516 and the NTN-DU 514 may each include additional capability to support the UE 505 access using NTN devices.

The NTN-DU 514 and the NTN-CU 516 may communicate with one another using an F1 Application Protocol (F1AP), and together may perform some or all of the same functions as the base station 506 or the NTN device 502/base station as described in connection with FIGS. 5B and 5C, respectively.

The NTN-DU 514 may terminate the radio interface and associated lower level radio interface protocols to the UE 505 and may transmit DL signals to the UE 505 and receive UL signals from the UE 505, which may include encoding and modulation of transmitted signals and demodulation and decoding of received signals. The operation of the NTN-DU 514 may be partly controlled by the NTN-CU 516. The NTN-DU 514 may support one or more NR radio cells for the UE 505. The NTN-CU 516 may also be split into separate control plane (CP) (NTN-CU-CP) and user plane (UP) (NTN-CU-UP) portions. The NTN-DU 514 and the NTN-CU 516 may communicate over an F1 interface to (a) support control plane signaling for the UE 505 using IP. Stream Control Transmission Protocol (SCTP) and F1 Application Protocol (F1AP) protocols, and (b) to support user plane data transfer for a UE using IP, User Datagram Protocol (UDP), PDCP, SDAP. GTP-U and NR User Plane Protocol (NRUPP) protocols.

The NTN-CU 516 may communicate with one or more other NTN-CUs and/or with one more other terrestrial base stations using terrestrial links to support an Xn interface between any pair of NTN-CUs and/or between the NTN-CU 516 and any terrestrial base station.

The NTN-DU 514 together with the NTN-CU 516 may: (i) support signaling connections and voice and data bearers to the UE 505; (ii) support handover of the UE 505 between different radio cells for the NTN-DU 514 and between different NTN-DUs; and (iii) assist in the handover (or transfer) of NTN devices between different NTN gateways or different core networks. The NTN-CU 516 may hide or obscure specific aspects of the NTN devices from the core network 510, e.g., by interfacing to the core network 510 in the same way or in a similar way to a terrestrial network base station.

In the network architecture 550 of FIG. 5C, the NTN-DU 514 that communicates with and is accessible from an NTN-CU may change over time with LEO devices. With the split base station architecture, the core network 510 may connect to NTN-CUs that are fixed and that do not change over time, which may reduce difficulty with paging of the UE 505. For example, the core network 510 may not need to know which NTN-DU is needed for paging the UE 505. The network architecture with regenerative payloads with a split base station architecture may thereby reduce the core network 510 impact at the expense of additional impact to the NTN-CU 516.

Support of regenerative payloads with a split base station architecture, as shown in FIG. 5C, may impact the network architecture 550 as follows. The impact to the core network 510 may be limited as for the transparent payloads (e.g., the NTN device 502) discussed above. For example, the core network 510 may treat a satellite RAT in the network architecture 550 as a new type of RAT with longer delay, reduced bandwidth and/or higher error rate. The impact on the NTN-DU 514 may be less than the impact on NTN device/base stations (e.g., the NTN device 502/base station with a non-split architecture), as discussed above in reference to FIG. 5B. The NTN-DU 514 may manage changing association with different (fixed) NTN-CUs. Further, the NTN-DU 514 may manage radio beams and radio cells. The NTN-CU 516 impacts may be similar to the impact of the base station 506 for a network architecture with transparent payloads, as discussed above, except for extra impacts to manage changing associations with different NTN-DUs and reduced impacts to support radio cells and radio beams, which may be transferred to the NTN-DU 514.

Figure 6A:
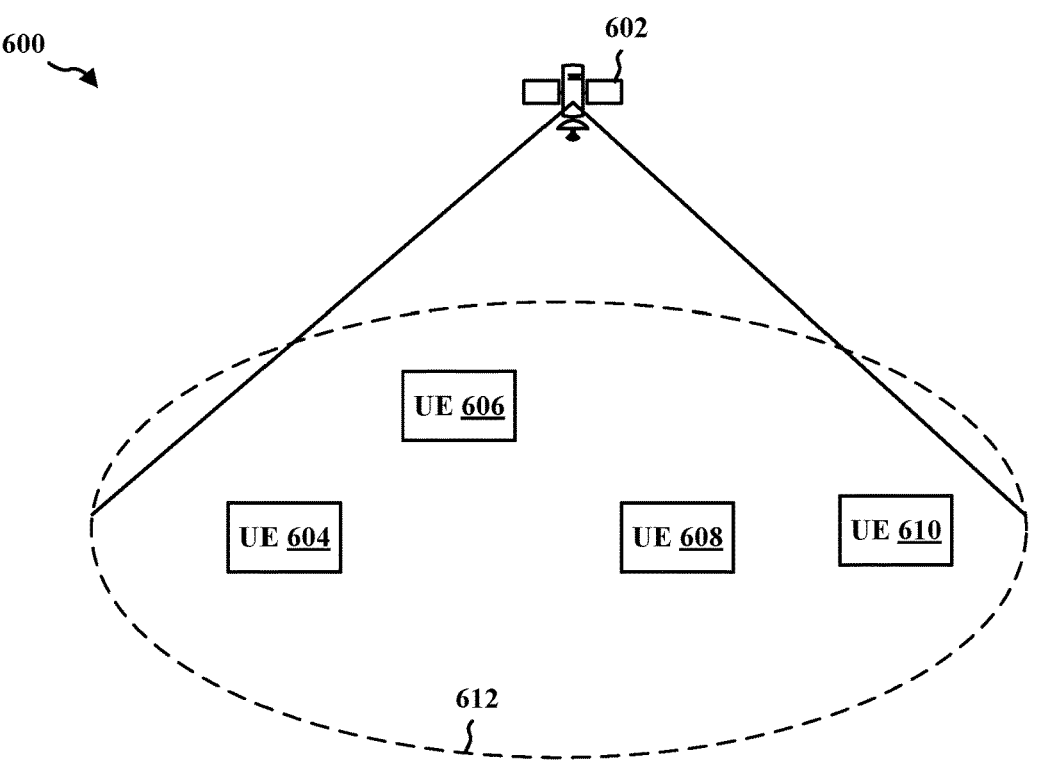
FIGS. 6A and 6B illustrate example aspects of direct NTN communication.
Figure 6B:
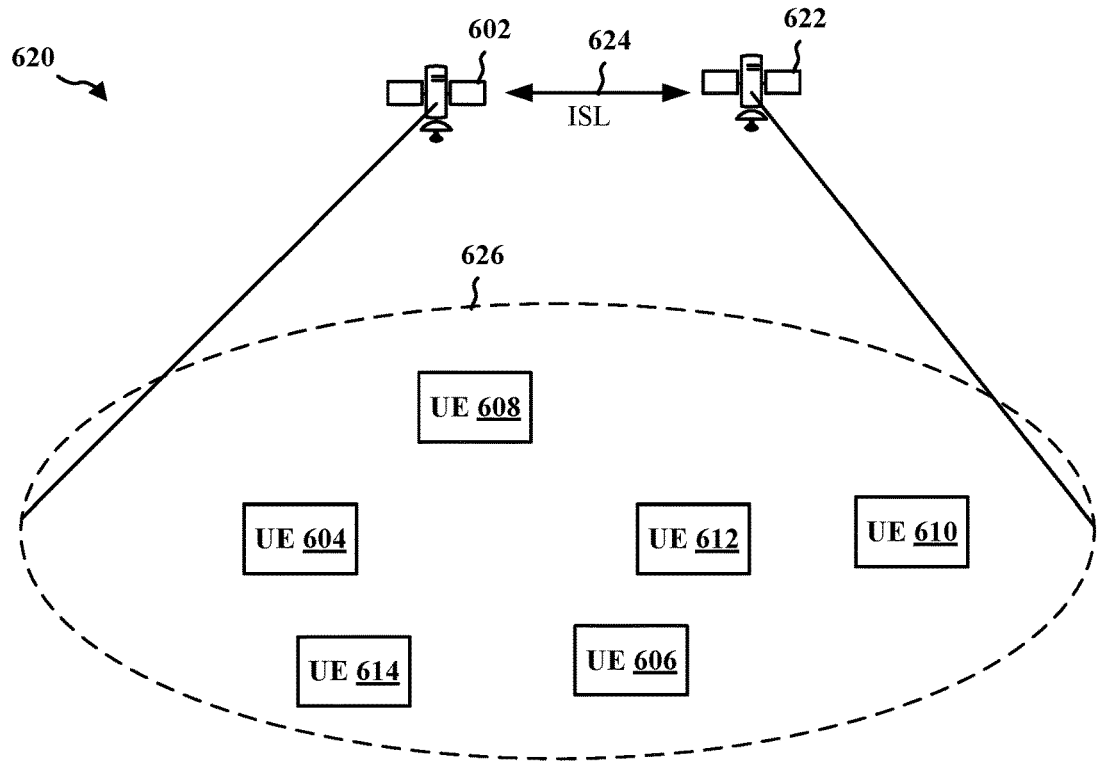

FIG. 6A shows a diagram 600 of an example of direct NTN communication. The diagram 600 includes a first aerial device 602 and a plurality of UEs (e.g., 604, 606, 608, 610) within a coverage area 612 of the first aerial device 602. FIG. 6B shows a diagram 620 of another example of direct NTN communication. The diagram 620 includes a first aerial device 602 and a second aerial device 622, where the first aerial device 602 and the second aerial device 622 are communicatively connected via ISL 624. The first aerial device 602 and the second aerial device 622 may provide a coverage area 626 that may provide coverage to one or more UEs (e.g., 604, 606, 608, 610, 612, 614) within a coverage area 626.

Due to NTN having a large coverage area, NTN may be able to provide coverage to at least two communicating UEs having a high probability. The ISL between two nearby aerial devices may be used to further enlarge the coverage area of the direct NTN communication. Direct NTN communication between UEs without going through feeder link or ground network may reduce latency and/or load on the feeder, while enabling communication in the event of a feeder link coverage hole. Furthermore, the control-plane may benefit without having to involve the feeder link or ground network, such as instances where a feeder link to ground NW is unavailable or to allow for a future NTN network to operate as an independent network from a TN network. As used herein, direct NTN communication may refer to two NTN devices communicating with each other via NTN without a feeder link.

Figure 7:
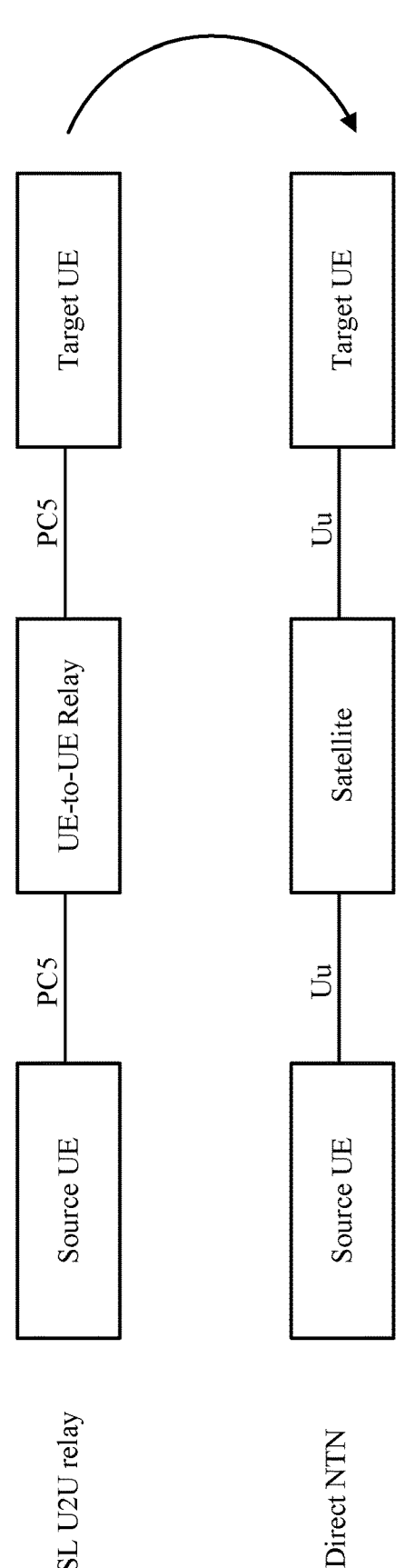
FIG. 7 is a diagram illustrating an example system architecture for direct NTN communication.

To enable the direct NTN communication between at least two UEs over their serving network node (e.g., aerial device, satellite, etc.) without a feeder link, the serving network node may act as a relay between two UEs for the direct NTN communication. In some aspects, upper layer (e.g. at non-access stratum (NAS) layer and/or application layer) design and functions (e.g. authorization, policy/parameter provision, security/privacy protection, etc) may include Sidelink (SL) UE-to-UE (U2U) relay, as shown in diagram 700 of FIG. 7, which may be considered as a baseline for supporting the direct NTN communication. In some aspects, the serving network node may leverage the NTN Uu interface at the access stratum (AS) layer to transport the upper layer data (e.g., NAS, application or service data) between the two UEs for supporting the direct NTN communication, as shown in diagram 700 of FIG. 7.

Figure 8A:
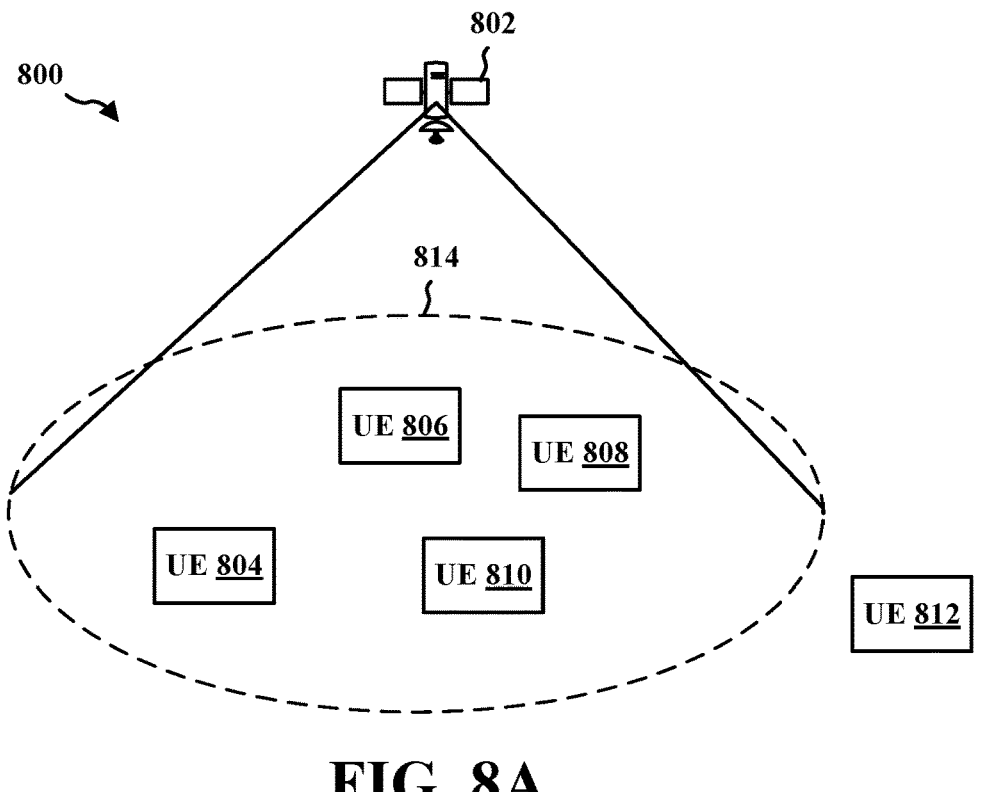
FIGS. 8A and 8B illustrate example aspects of direct NTN communication.
Figure 8B:
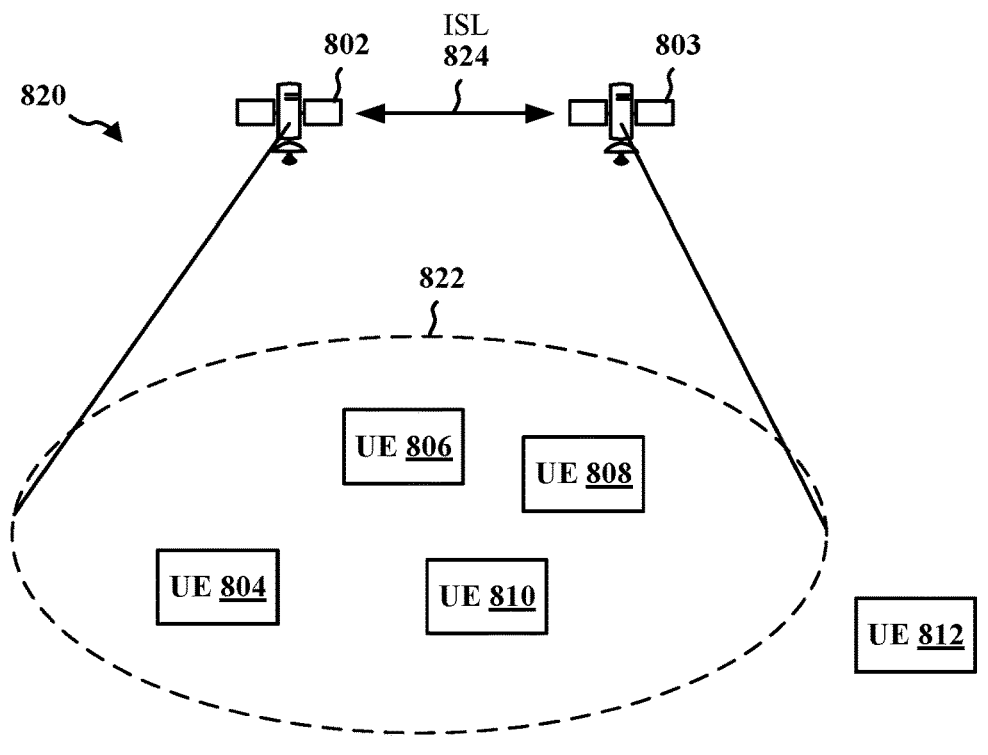

In order for two UEs to communicate with each other over the direct NTN communication, a UE (e.g. an initiating UE) may determine if a peer UE(s) is reachable through the direct NTN communication. For example, as shown in diagram 800 of FIG. 8A, UE 804 may reach UEs 806, 808, 810 via the direct NTN communication, since the UEs 804, 806, 808, 810 are within the coverage 814 of aerial device 802. However, UE 804 may not reach UE 812 via the direct NTN communication due to UE 812 being beyond the coverage of aerial device 802. In another example, as shown in diagram 820 of FIG. 8B, UE 804 may reach UEs 806, 808, 810 via the direct NTN communication since the UEs 804, 806, 808, 810 are within the coverage 822 aerial device 802 and aerial device 803 connected via ISL 824. However, UE 804 may not reach UE 812 via the direct NTN communication due to UE 812 being beyond the coverage of aerial device 802 and aerial device 803.

In some instances, an aerial device may be equipped with a function/hardware for maintaining and updating a database of all the reachable UEs for direct NTN communication. In such instances, the aerial device(s) may determine that UEs 806, 808, 810 are reachable within the respective coverage areas, and may determine that UE 812 is not reachable due in part to UE 812 being beyond the coverage area. Since aerial devices are mobile and may move quickly, a UE may frequently update the database (e.g., a reachable UE may become non-reachable or vice versa), regardless if the UE will be reached or contacted by another UE, which may result in consuming resources and increasing the complexity of the system.

Aspects presented herein provide a configuration for an initial end-to-end discovery procedure in direct NTN communication. The aspects presented herein may allow a UE to determine if an intended communication peer UE is reachable over a direct NTN communication. For example, a UE may receive an indication from a network entity that the direct NTN communication is supported such that communication between the UE and the intended communication peer UE may bypass ground-based feeder links. At least one advantage of the disclosure is that the disclosure provides an efficient mechanism to enable an initiating UE to discover if its peer UE is reachable via a proposed direct NTN communication, whether a feeder link(s) connecting the aerial device(s) is available or unavailable.

In some instances, aerial devices (e.g., satellites) may not be required to maintain a centralized real-time database comprised of reachable UEs over direct NTN communication. UEs may be configured to discover or determine if an intended communication peer UE is reachable over the direct NTN communication. For example, the aerial device (e.g., satellite) which may operate as a network node may send an indication to a UE indicating the ability to support direct NTN communication. In some aspects, the indication may indicate information regarding the supported direct NTN communication, such as but not limited to, a reachable area over the direct NTN communication, supported services over the direct NTN communication, or supported QoS flows over the direct NTN communication. In some instances, the initiating UE may determine whether to send a first message to the intended peer UE over the direct NTN communication system based on the indication indicating support for the direct NTN communication. The first message may be considered as a communication request message or a discovery message. The determination whether to send the first message may be based on at least one of a location of the initiating UE, a location of the peer UE (e.g., estimated or preconfigured), a communication range requirement, a pre-configured or configurable area for the location of the initiating UE, a service associated to a potential link between the initiating UE and the one or more peer UEs, and/or the QoS requirements of a service associated with the potential link between the initiating UE and the one or more peer UEs.

In some aspects, after the initiating UE sends the first message, the initiating UE may receive a second message from the peer UE. The second message may comprise a response message indicating that the peer UE is reachable over the direct NTN communication. At least one of the initiating UE or the one or more peer UE(s) may be configured to determine if the other communication end is reachable via the direct NTN communication. In instances where the initiating UE or the one or more peer UEs determine that the other communication end is reachable via the direct NTN communication, then the initiating UE or the one and/or more peer UEs may also determine that the request for setting up an end-to-end (E2E) link over the direct NTN communication and, thus, the initiating UE and/or the one or more peer UEs may proceed to the link setup or configuration procedure.

In some aspects, the indication may be provided by the NTN node via a broadcasted message, such as but not limited to SIB and/or a dedicated message (e.g., RRC signaling and/or MAC-CE). In some aspects, when the NTN node obtains the first message, the NTN node may process, read, and/or modify the first message before the first message is relayed to the potential peer UE(s). For example, the NTN node may add additional information used for the peer UE(s) to send a feedback message (e.g. the second message). In some aspects, when NTN node relays the first message, the first message may be broadcasted such that a peer UE interested in receiving a message over the direct NTN communication may monitor and receive the first message. For example, the peer UE may be configured by the NTN node or pre-configured with a set of resources and/or configurations to monitor and receive the message. In some aspects, the first message and/or the modified first message may comprise information used to identify the peer UE(s) (e.g. a peer UE identifier (ID), a service ID, and/or an application ID). For example, the information may be information used in an upper layer of the UE (e.g. a layer above the access stratum (AS) layer). In some aspects, in response to receiving the first message at the peer UE, the peer UE may be aware of a request for an E2E communication with the initiating UE and may proceed to set up the E2E link. In some aspects, in response to receiving the first message at the peer UE, the peer UE may send a response message back to the initiating UE, wherein the response message may trigger or assist the initiating UE to determine to set up the E2E link. In some aspects, the first message and/or the second message (e.g. feedback message for the first message) may be transmitted over the Uu interface between the NTN node and a respective UE.

Figures 9A, 9B:
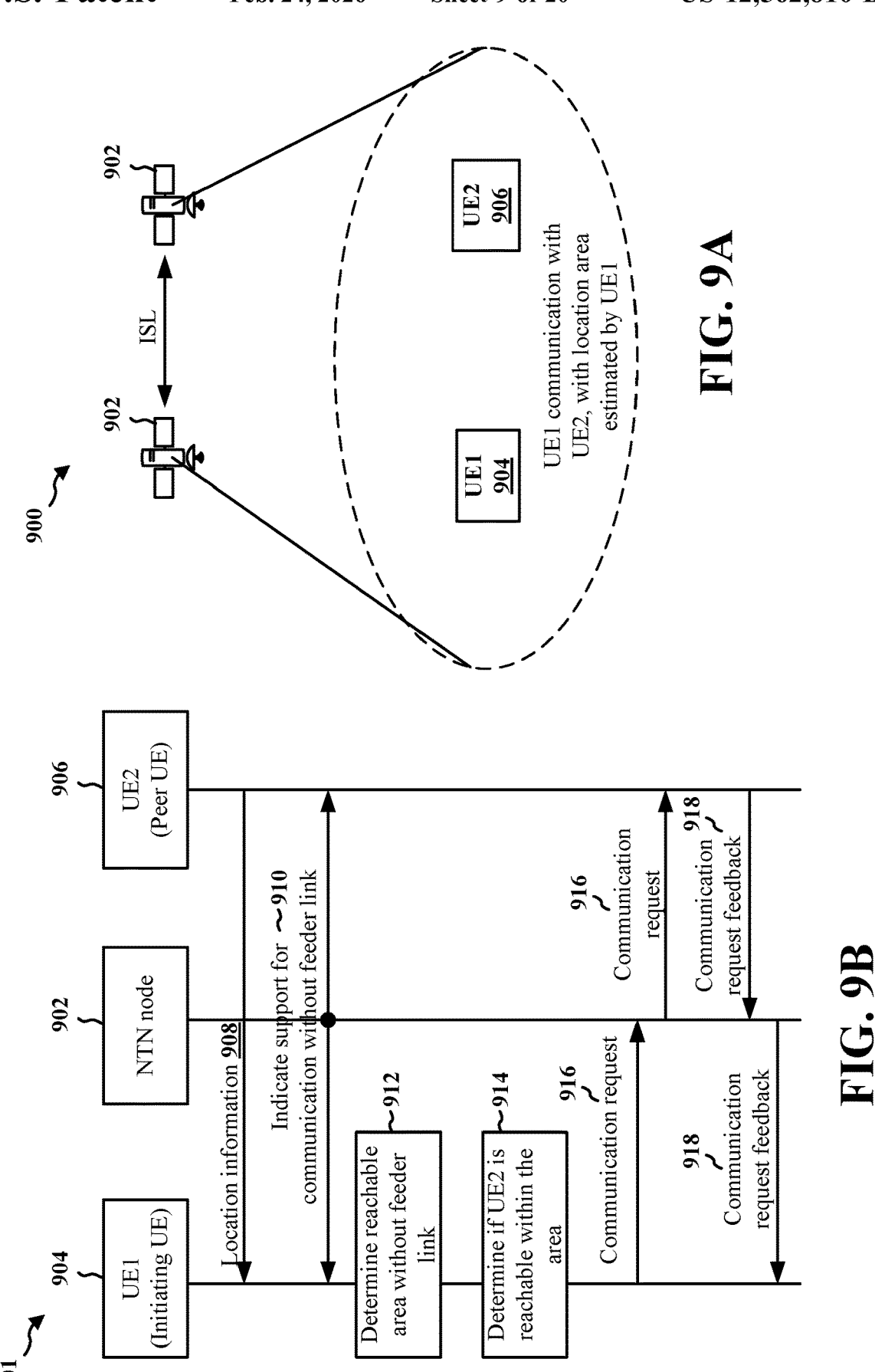
FIG. 9A is a diagram illustrating an example of the direct NTN communication where an initiating UE communicates with a peer UE.
FIG. 9B is a call flow diagram of the direct NTN communication diagram of FIG. 9A.

FIG. 9A provides a diagram 900 of an initial E2E discovery procedure. FIG. 9B provides a call flow diagram 901 of the initial E2E discovery procedure of the diagram 900 of FIG. 9A. The initial E2E discovery procedure of diagram 900 of FIG. 9A is an instance where a location area may be estimated by an initiating UE. The diagram 900 of FIG. 9A includes at least one NTN node 902 (e.g., aerial device, satellite) operating as an NTN network node. In some aspects, there is a single NTN node 902, while in some aspects, there may be a plurality of NTN nodes 902, where each of the plurality of NTN nodes are connected via ISL. The example of diagram 900 includes two NTN nodes 902, while the call flow diagram 901 includes one NTN node 902. In the diagram 900/901, the UE1 904 may be the initiating UE and UE2 906 may be the peer UE. In the example of diagram 900/901, the UE1 904 may communicate with UE2 906 via the direct NTN connection where the location area may be estimated by UE 1 904.

With reference to diagram 901 of FIG. 9B, at 908, in some aspects, the UE1 904 may be configured with location information of UE2 906. For example, the UE1 904 may receive the location information of UE2 906. The location information of UE2 906 may comprise the information related to the country or city of the UE2 906. The UE2 906 or the NTN node 902 may provide an indication to the UE1 904 to update the location information of the UE2 906 periodically or based on an event (e.g., mobility event). In some aspects, UE1 and UE2 may have a previous communication link (e.g., sidelink. TN, NTN), prior to 908, wherein the communication link may be used for UE2 to transmit its location information to UE1.

At 910, the NTN node 902 may provide an indication indicating the support of direct NTN communication. The NTN node 902 may provide the indication indicating the support of the direct NTN communication to at least the UE1 904 and/or UE2 906. In some aspects, the NTN node 902 may indicate a list comprising one or more reachable areas.

At 912, the UE1 904 may determine a reachable area without the feeder link. The UE1 904 may determine the area that may be reached over the NTN node 902 without the feeder link based on the indication indicating the support of the direct NTN communication and/or the list comprising one or more reachable areas.

At 914, the UE1 904 may determine if the UE2 906 is reachable within the area. If the UE1 904 determines that UE2 906 is located within the direct NTN communication's reachable coverage, then the UE1 904 may decide to transmit a communication request. In some aspects, UE1 904 may determine that UE2 906 is within the direct NTN communication reachable area based on the location information of UE2 906 included in the list of supported areas.

At 916, the UE1 904 may transmit the communication request to the NTN node 902, which may be relayed to the UE2 906 via the NTN node 902. In some aspects, the NTN node 902 may modify the communication request prior to providing the communication request to the UE2 906. In some aspects, the modified communication request may comprise additional information used for at least the UE2 to send a feedback message.

At 918, the UE2 906 may transmit a communication request feedback to the NTN node 902 which may be relayed to the UE1 904 via the NTN node 902. In some aspects, the NTN node 902 may modify the communication request feedback prior to providing the communication request feedback to the UE1 904. The modified communication request feedback may comprise additional information used by the UE1 for the direct NTN communication with UE2.

Figures 10A, 10B:
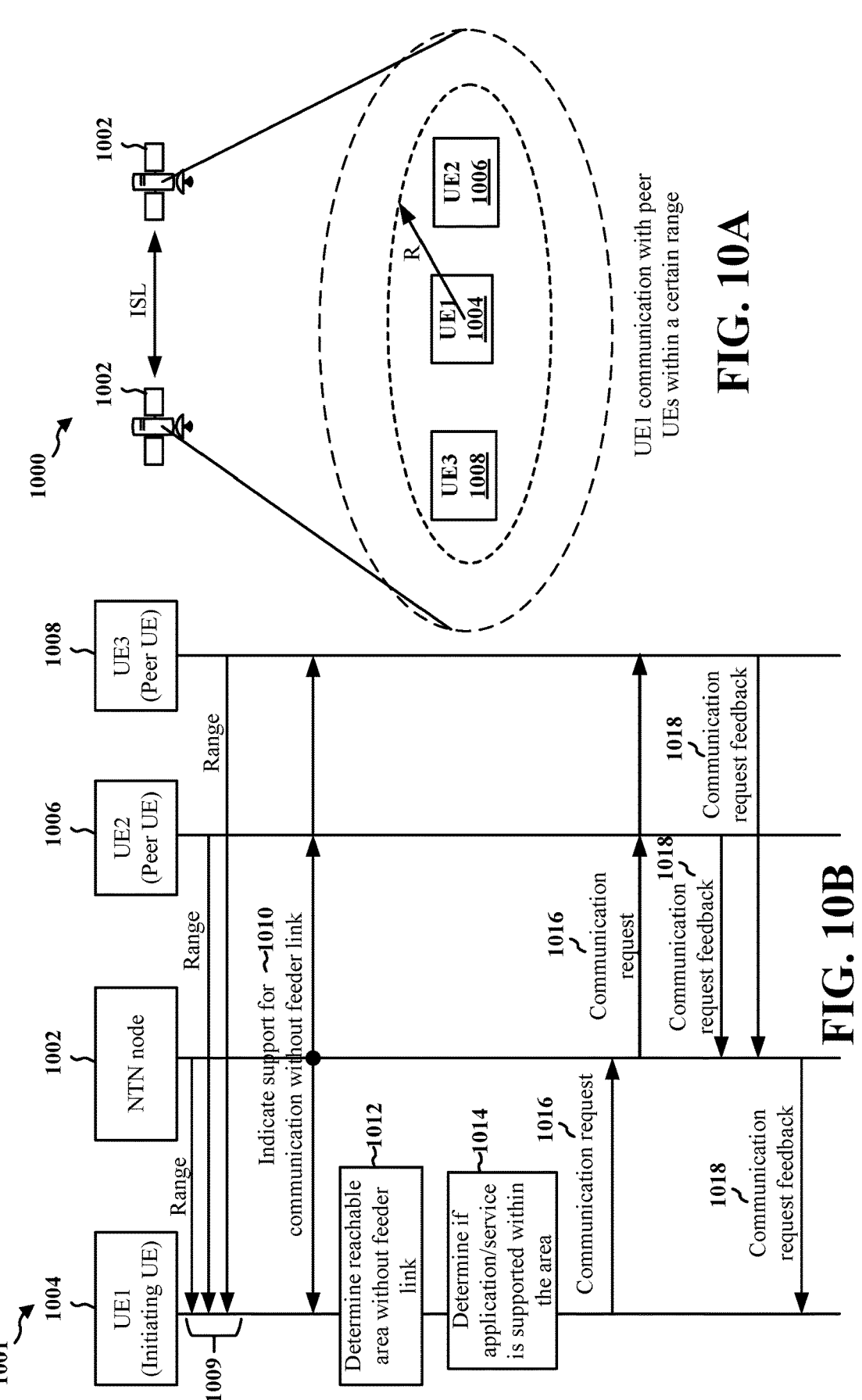
FIG. 10A is a diagram illustrating an example of the direct NTN communication where an initiating UE communicates with a peer UE within a certain range.
FIG. 10B is a call flow diagram of the direct NTN communication diagram of FIG. 10A.

FIG. 10A provides a diagram 1000 of an initial E2E discovery procedure. FIG. 10B provides a call flow diagram 1001 of the initial E2E discovery procedure of the diagram 1000 of FIG. 10A. The initial E2E discovery procedure of diagram 1000 of FIG. 10A is an instance where the initiating UE may communicate with one or more peer UEs within a certain range from the initiating UE. The diagram 1000 of FIG. 10A includes at least one NTN node 1002 (e.g., aerial device, satellite) operating as an NTN network node. In some aspects, there is a single NTN node 1002, while in some aspects, there may be a plurality of NTN nodes 1002, where each of the plurality of NTN nodes are connected via ISL. The example of diagram 1000 includes two NTN nodes 1002, while the call flow diagram 1001 includes one NTN node 1002. In the diagram 1000/1001, the UE1 1004 may be the initiating UE and UE2 1006 may be the peer UE. In the example of diagram 1000/1001, the UE1 1004 may communicate with UE2 1006 via the direct NTN connection where UE2 is within a certain range R.

With reference to diagram 1001 of FIG. 10B, at 1009, in some aspects, the UE1 1004 may be configured with a proximity range. For example, at least one of the NTN node 1002, UE2 1006, or UE3 1008 may provide the UE1 1004 with a proximity range configuration. In some aspects, the UE1 1004 may be preconfigured with a proximity range configuration. For example, a proximity range configuration may be associated to a specific (set of) application, traffic, and/or service to be transmitted over the direct NTN communication.

At 1010, the NTN node 1002 may provide an indication indicating the support of direct NTN communication. The NTN node 1002 may provide the indication indicating the support of the direct NTN communication to at least the UE1 1004, UE2 1006, and/or UE3 1008. In some aspects, the NTN node 1002 may indicate a list comprising one or more reachable areas.

At 1012, the UE1 1004 may determine a reachable area without the feeder link. The UE1 1004 may determine the area that may be reached over the NTN node 1002 without the feeder link based on the indication indicating the support of the direct NTN communication.

At 1014, the UE1 1004 may determine if an application or service is supported within the area. For example, the UE1 1004 may determine if the communication range for a targeted application or service may be supported based on at least the NTN coverage, the location of the UE1 1004, and/or the communication range for the targeted application or service.

At 1016, the UE1 1004 may transmit the communication request to the NTN node 1002, which may be relayed to at least the UE2 1006 and/or the UE3 1008 via the NTN node 1002. In some aspects, the NTN node 1002 may modify the communication request prior to providing the communication request to at least the UE2 1006 and/or UE3 1008. The modified communication request may comprise additional information used for at least the UE2 and UE3 to send a corresponding feedback message.

At 1018, at least the UE2 1006 and/or the UE3 1008 may transmit a communication request feedback to the NTN node 1002 which may be relayed to the UE1 1004 via the NTN node 1002. In some aspects, the NTN node 1002 may modify the communication request feedback prior to providing the communication request feedback to the UE1 1004. The modified communication request feedback may comprise additional information used by the UE1 for the direct NTN communication with at least the UE2 and/or UE3.

Figures 11A, 11B:
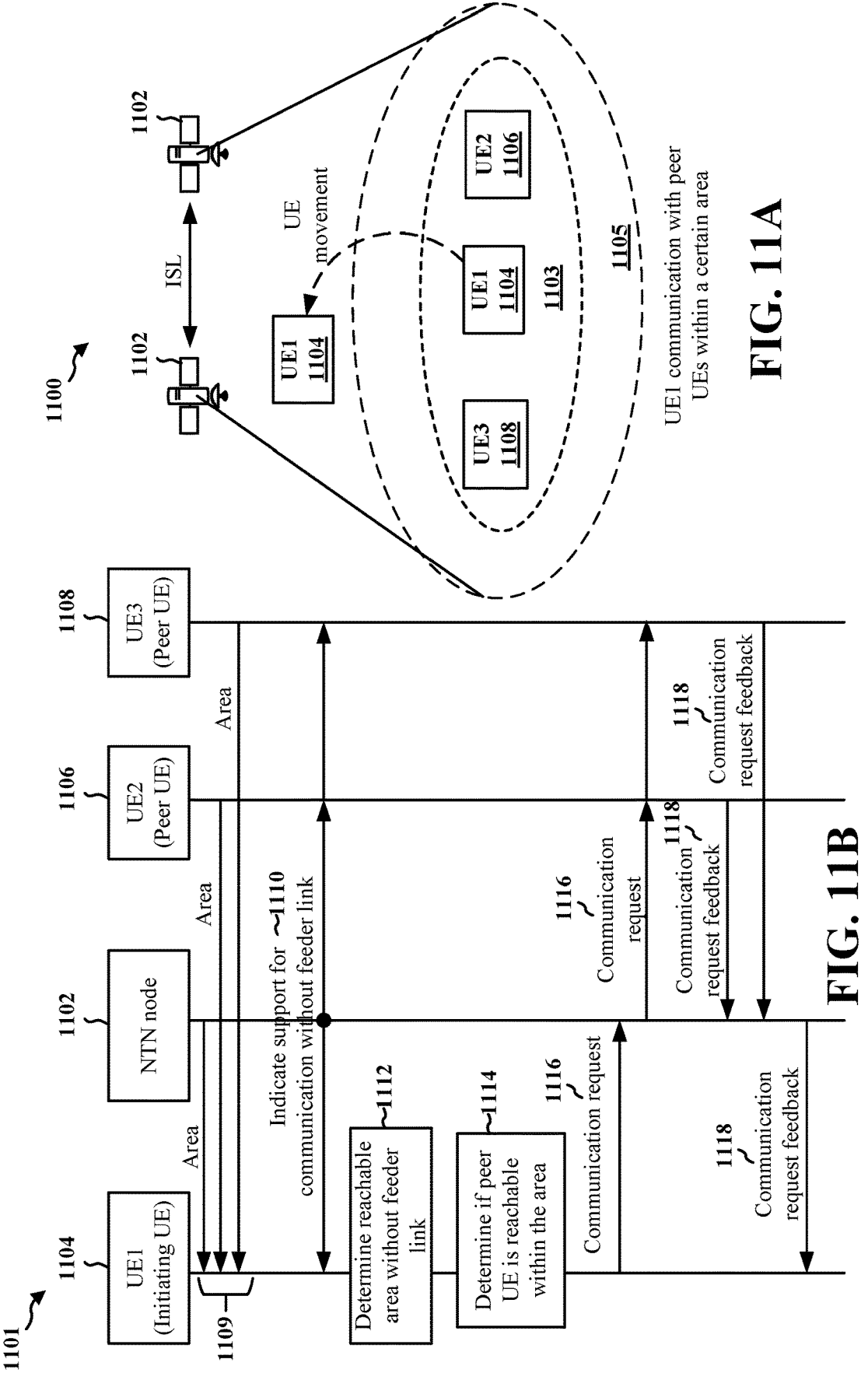
FIG. 11A is a diagram illustrating an example of the direct NTN communication where an initiating UE communicates with a peer UE within a configured area.
FIG. 11B is a call flow diagram of the direct NTN communication diagram of FIG. 11A.

FIG. 11A provides a diagram 1100 of an initial E2E discovery procedure. FIG. 11B provides a call flow diagram 1101 of the initial E2E discovery procedure of the diagram 1100 of FIG. 11A. The initial E2E discovery procedure of diagram 1100 of FIG. 11A is an instance where the initiating UE may communicate with one or more peer UEs within a certain range. The diagram 1100 of FIG. 11A includes at least one NTN node 1102 (e.g., aerial device, satellite) operating as an NTN network node. In some aspects, there is a single NTN node 1102, while in some aspects, there may be a plurality of NTN nodes 1102, where each of the plurality of NTN nodes are connected via ISL. The example of diagram 1100 includes two NTN nodes 1102, while the call flow diagram 1101 includes one NTN node 1102. In the diagram 1100/1101, the UE1 1104 may be the initiating UE and UE2 1106 may be the peer UE. In the example of diagram 1100/1101, the UE1 1104 may communicate with peer UEs (e.g., UE2 1106, UE3 1108) via the direct NTN connection when UE1 is within an area (pre-configured or configurable).

With reference to diagram 1101 of FIG. 11B, at 1109, in some aspects, the UE1 1104 may be configured with an area (e.g., 1103, 1105). For example, at least one of the NTN node 1102. UE2 1106, or UE3 1108 may provide the UE1 1104 with an area configuration.

At 1110, the NTN node 1102 may provide an indication indicating the support of direct NTN communication. The NTN node 1102 may provide the indication indicating the support of the direct NTN communication to at least the UE1 1104, UE2 1106, and/or UE3 1108. In some aspects, the NTN node 1102 may indicate a list comprising one or more reachable areas.

At 1112, the UE1 1104 may determine a reachable area without the feeder link. The UE1 1104 may determine the area that may be reached over the NTN node 1102 without the feeder link based on the indication indicating the support of the direct NTN communication.

At 1114, the UE1 1104 may determine if the peer UE(s) (e.g., UE2 1106, UE3 1108) are reachable within the area (e.g., 1103, 1105). For example, the UE1 1104 may determine if the UE2 1106 or UE3 1108 are reachable within the area based on whether the UE1 1104 is still within the area or has moved out beyond the area (e.g., the area configuration received at 1109). In some aspects, if the UE1 1104 has moved outside of the area, the UE2 1106 and UE3 1108 may still be within the area, such that the direct NTN communication is not supported. In some aspects, the area configuration may be determined based on the reachable area of the direct NTN communication.

At 1116, the UE1 1004 may transmit the communication request to the NTN node 1102, which may be relayed to at least the UE2 1006 and/or the UE3 1108 via the NTN node 1102. In some aspects, the NTN node 1102 may modify the communication request prior to providing the communication request to at least the UE2 1106 and/or UE3 1108. The modified communication request may comprise additional information used for at least the UE2 and UE3 to send a corresponding feedback message.

At 1118, at least the UE2 1106 and/or the UE3 1108 may transmit a communication request feedback to the NTN node 1102 which may be relayed to the UE1 1104 via the NTN node 1102. In some aspects, the NTN node 1102 may modify the communication request feedback prior to providing the communication request feedback to the UE1 1104. The modified communication request feedback may comprise additional information used by the UE1 for the direct NTN communication with at least the UE2 and/or UE3.

Figures 12A, 12B:
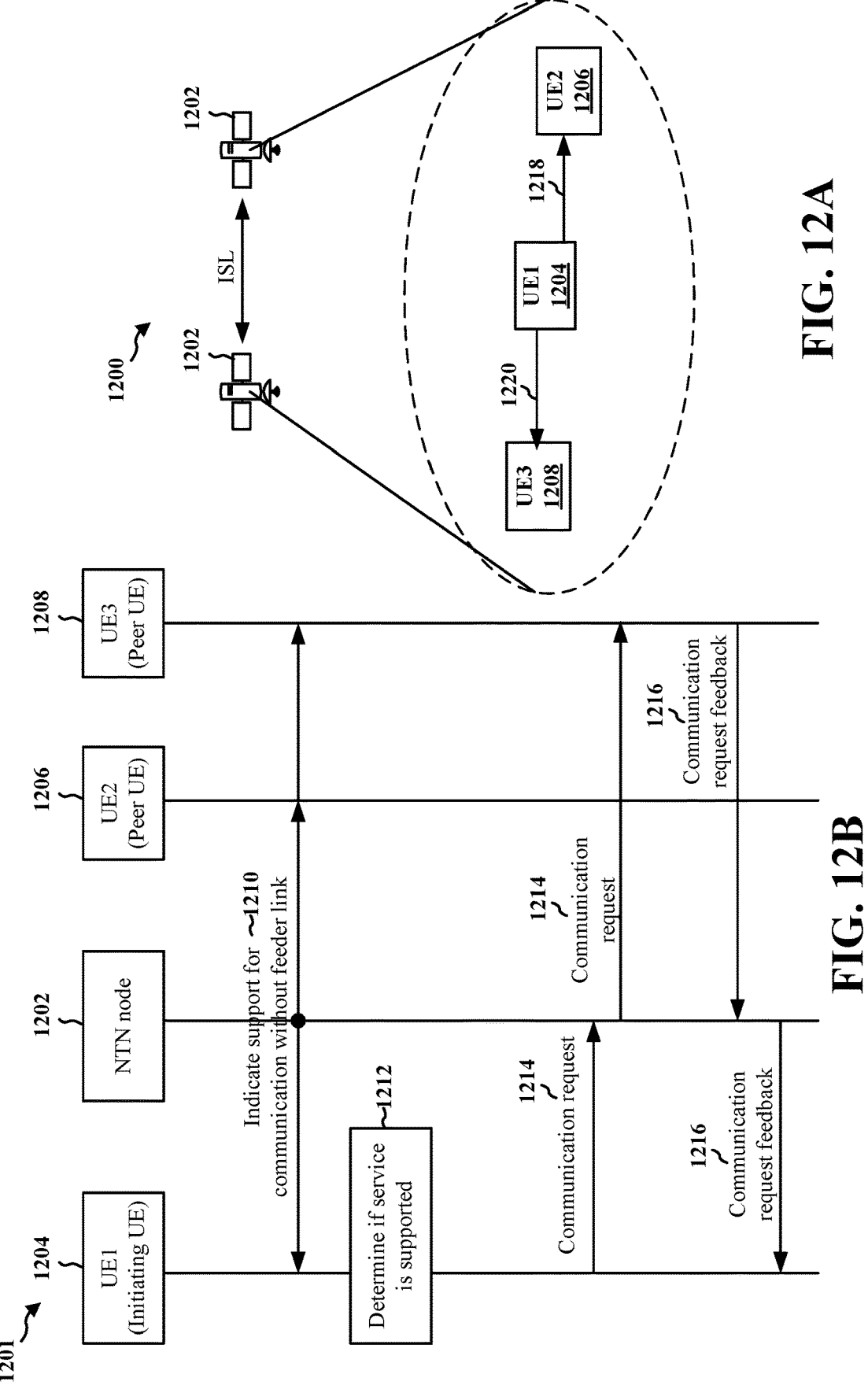
FIG. 12A is a diagram illustrating an example of the direct NTN communication where an initiating UE utilizes different communication services with same or different peer UEs.
FIG. 12B is a call flow diagram of the direct NTN communication diagram of FIG. 12A.

FIG. 12A provides a diagram 1200 of an initial E2E discovery procedure. FIG. 12B provides a call flow diagram 1201 of the initial E2E discovery procedure of the diagram 1200 of FIG. 10A. The initial E2E discovery procedure of diagram 1200 of FIG. 12A is an instance where the initiating UE may utilize different communication services with different QoS thresholds for the same or different peer UEs. The diagram 1200 of FIG. 12A includes at least one NTN node 1202 (e.g., aerial device, satellite) operating as an NTN network node. In some aspects, there is a single NTN node 1202, while in some aspects, there may be a plurality of NTN nodes 1202, where each of the plurality of NTN nodes are connected via ISL. The example of diagram 1200 includes two NTN nodes 1202, while the call flow diagram 1201 includes one NTN node 1202. In the diagram 1200/1201, the UE1 1204 may be the initiating UE and UE2 1206 may be the peer UE. In the example of diagram 1200/1201, the UE1 1204 may communicate with UE2 1206 and/or UE3 1208 via the direct NTN connection using different communication services having different or similar QoS thresholds.

At 1210, the NTN node 1202 may provide an indication indicating the support of direct NTN communication without a feeder link. In some aspects, the indication may indicate the support of the direct NTN communication without the feeder link and/or supported services (e.g., 1218, 1220) with the direct NTN communication. The NTN node 1202 may provide the indication indicating the support of the direct NTN communication to at least the UE1 1204, UE2 1206, and/or UE3 1208. In some aspects, the NTN node 1202 may indicate the services and/or the QoS flows that may be supported by the NTN communication. In some aspects, the NTN node 1202 may indicate one or more lists of areas, wherein each list indicates the areas that are reachable by the direct NTN communication for one or a set of services and/or the QoS flows.

At 1212, the UE1 1204 may determine if a targeted service may be supported. For example, UE1 1204 may determine if the targeted service may be supported based on the indication indicating support for the direct NTN communication. In some aspects, the UE1 1204 may determine if the targeted application or service may be supported based at least on indicated services and/or QoS flows, corresponding reachable areas, and/or the application and/or service thresholds.

At 1214, the UE1 1204 may transmit the communication request to the NTN node 1202, which may be relayed to at least the UE2 1206 and/or the UE3 1208 via the NTN node 1202. In some aspects, the NTN node 1202 may modify the communication request prior to providing the communication request to at least the UE2 1206 and/or UE3 1208. The modified communication request may comprise additional information used for at least the UE2 and UE3 to send a corresponding feedback message.

At 1216, at least the UE2 1206 and/or the UE3 1208 may transmit a communication request feedback to the NTN node 1202 which may be relayed to the UE1 1204 via the NTN node 1202. In some aspects, the NTN node 1202 may modify the communication request feedback prior to providing the communication request feedback to the UE1 1204. The modified communication request feedback may comprise additional information used by the UE1 for the direct NTN communication with at least the UE2 and/or UE3.

Figure 13:
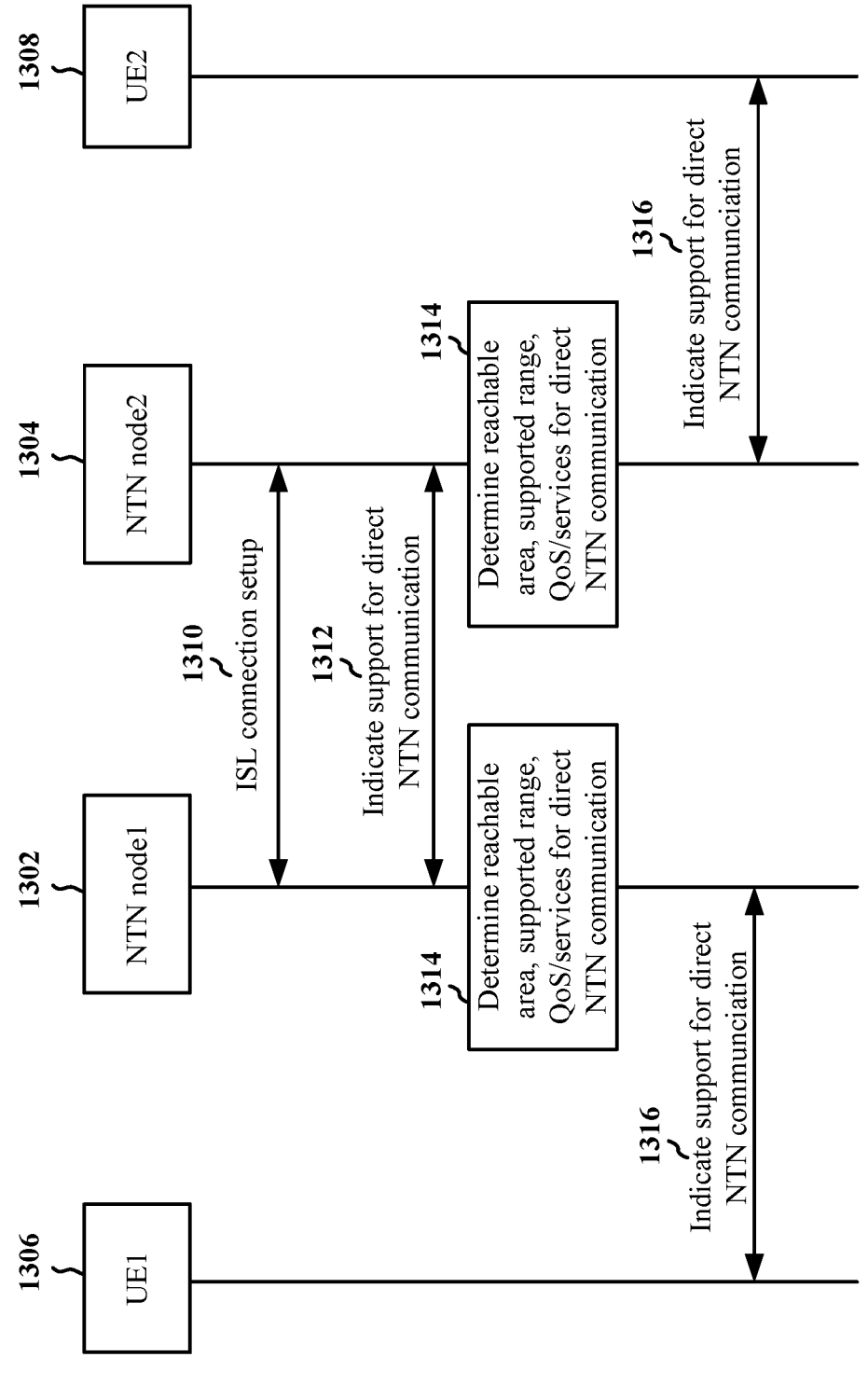
FIG. 13 is a call flow diagram of an ISL procedure between two NTN nodes.

FIG. 13 provides a diagram 1300 of an ISL procedure between two NTN nodes (e.g., NTN node1 1302, NTN node2 1304). The ISL procedure of the diagram 1300 is an instance where two NTN nodes support the direct NTN communication.

At 1310, the NTN node1 1302 and NTN node2 1304 may initiate an ISL connection setup.

At 1312, at least one of NTN node1 1302 and/or NTN node2 1304 may indicate support for the direct NTN communication without a feeder link to an NTN node having an ISL connection. For example, in some aspects, NTN node1 1302 may provide an indication to NTN node2 1304 indicating support for the direct NTN communication. In some aspects, NTN node2 1304 may provide the indication to NTN node1 1302 indicating the support for the direct NTN communication. In some aspects, the NTN node may further indicate additional information related to the direct NTN communication, such as but not limited to, information related with reachable areas, NTN node (e.g., aerial device, satellite) orbit or movement, NTN node (e.g., aerial device, satellite) antenna configuration (e.g., direction or beamwidth), or supported QoS and/or services.

At 1314, each of the NTN nodes (e.g., NTN node1 1302, NTN node2 1304) may determine at least one of a reachable area, a supported communication range, and/or supported QoS and/or services for the direct NTN communication. Each of the NTN nodes (e.g., NTN node1 1302, NTN node2 1304) may determine at least one of the reachable area, the supported communication range, and/or the supported QoS and/or services for the direct NTN communication based on the indication indicating the support for the direct NTN communication obtained from a neighboring NTN node.

At 1316, each of the NTN nodes (e.g., NTN node1 1302, NTN node2 1304) may provide an indication indicating support for the direct NTN communication without a feeder link to a respective serving UE. For example, NTN node1 1302 may provide the indication indicating support for the direct NTN communication without the feeder link to UE1 1306. In another example, NTN node2 1304 may provide the indication indicating support for the direct NTN communication without the feeder link to UE2 1308. The indication indicating support for the direct NTN communication without the feeder link provided to the serving UE (e.g., UE1 1306, UE2 1308) from the NTN node (e.g., NTN node1 1302, NTN node2 1304) may indicate at least one of one or more reachable areas or the supported QoS flows and/or services.

Figure 14:
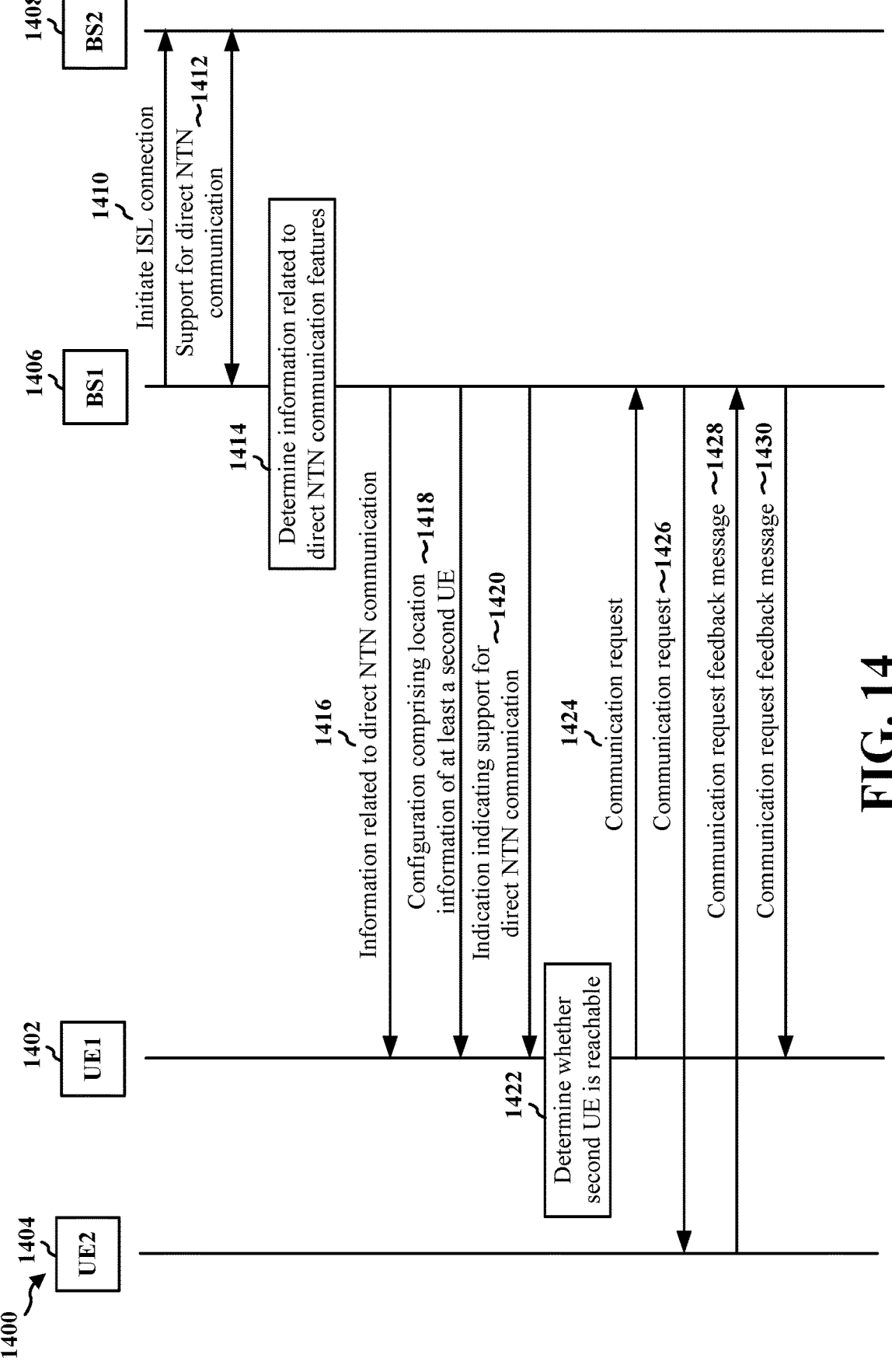
FIG. 14 is a call flow diagram of signaling between a UE and a base station.

FIG. 14 is a call flow diagram 1400 of signaling between a UE (e.g., UE1 1402 or UE2 1404) and a base station (e.g., BS1 1406 or BS1 1408). The base station (e.g., BS1 1406 or BS1 1408) may be configured to provide at least one cell. The UE (e.g., UE1 1402 or UE2 1404) may be configured to communicate with the base station (e.g., BS1 1406 or BS1 1408). For example, in the context of FIG. 1, the base station (e.g., BS1 1406 or BS1 1408) may correspond to base station 102 and the UE (e.g., UE1 1402 or UE2 1404) may correspond to at least UE 104. In another example, in the context of FIG. 3, the base station (e.g., BS1 1406 or BS1 1408) may correspond to base station 310 and the UE (e.g., UE1 1402 or UE2 1404) may correspond to UE 350.

At 1410, the first base station 1406 may initiate an inter-satellite link (ISL) connection with at least a second base station 1408. In some aspects, each of the first base station 1406 and at least the second base station 1408 may comprise a satellite. The satellite may operate as a NTN network node. In some aspects, the first base station 1406 may initiate the ISL connection with at least the second base station 1408 such that the direct NTN connection may occur across the first base station 1408 and at least the second base station 1408. In some aspects, the first base station 1406 does not initiate the ISL connection if at least the second base station 1408 is not within range of the first base station 1406.

At 1412, the first base station 1406 may provide or obtain an indication associated to the support for the direct NTN communication. In some aspects, the first base station 1406 may provide the indication associated to the support for the direct NTN communication to at least the second base station 1408. In some aspects, the first base station 1406 may obtain the indication associated to the support for the direct NTN communication from at least the second base station 1408.

At 1414, the first base station 1406 may determine information associated to direct NTN communication features based on the corresponding indication associated to the support for the direct NTN communication from at least the second base station 1408.

At 1416, the first base station 1406 may provide the information associated to the direct NTN communication to the first UE 1402.

At 1418, the first base station 1406 may provide a configuration comprising location information of at least the second UE 1404 to the first UE 1402. The first UE 1402 may receive the configuration comprising location information of at least the second UE 1404 from the first base station 1406. In some aspects, the location information may comprise at least one of an area for a location of at least the second UE, updated location information of at least the second UE, a communication range for communication with at least the second UE, or at least one reachable area for the direct NTN communication.

At 1420, the first base station 1406 may provide an indication indicating support for a direct NTN communication to the first UE 1402. The first UE 1402 may receive the indication indicating the support for the direct NTN communication from the first base station 1406. The direct NTN communication may be between the first UE 1402 and at least the second UE 1404 may bypass ground-based feeder links. In some aspects, the indication includes information associated with at least one of a reachable area for the direct NTN communication, supported services for the direct NTN communication, or supported QoS flows over for direct NTN communication. In some aspects, the indication indicating the support for the direct NTN communication may be provided via at least one of a SIB, RRC signaling, or MAC-CE.

At 1422, the first UE 1402 may determine whether at least the second UE 1404 is reachable for transmission of the communication request. based on the indication that the first base station 1406 supports the direct NTN communication. In some aspects, a determination of whether at least the second UE is reachable may be based on at least one of a first location of the first UE, a second location of at least the second UE, a communication range, an area for the location of the first UE, a service associated with a link between the first UE and at least the second UE, or a QoS of the service associated with the link between the first UE and at least the second UE.

At 1424, the first UE 1402 may transmit a communication request for the direct NTN communication with at least the second UE 1404 based on the indication indicating the support for the direct NTN communication. The first UE 1402 may transmit the communication request for the direct NTN communication to the first base station 1406. The first base station 1406 may obtain the communication request for the direct NTN communication from the first UE 1402. The communication request may be transmitted to at least the second UE via the direct NTN communication, via the first base station 1406. In some aspects, the communication request may comprise information used to identify at least one of the first UE and at least the second UE. In some aspects, the communication request or a communication request feedback message between the first UE and at least the second UE may be transmitted or received via a Uu interface.

At 1426, the first base station 1406 may provide the communication request to at least the second UE 1404. In some aspects, the communication request provided to at least the second UE may comprise a modified communication request. The modified communication request may be modified by the first base station 1406. For example, the modified communication request may be modified by the network entity prior to providing the communication request to at least the second UE. The modified communication request may comprise additional information used for at least the second UE to send a feedback message.

At 1428, at least the second UE 1404 may transmit a communication request feedback message to the first base station 1406 in response to the communication request from the first UE 1402 via the first base station 1406. The first base station 1406 may obtain the communication request feedback message from at least the second UE 1404.

At 1430, the first base station 1406 may provide the communication request feedback message indicating that at least the second UE 1404 may be reachable over the direct NTN communication to the first UE 1402. The first UE 1402 may receive the communication request feedback message from the first base station 1406. The first base station 1406 may provide the communication request feedback message to the first UE in response to obtaining the communication request feedback message from at least the second UE. The first UE 1402 may communicate with at least the second UE 1404 via the direct NTN communication.

FIG. 15 is a flowchart 1500 of a method of wireless communication. The method may be performed by a first UE (e.g., the UE 104; the apparatus 1704). One or more of the illustrated operations may be omitted, transposed, or contemporaneous. The method may allow a UE to determine if an intended communication peer UE is reachable over a direct NTN communication.

At 1502, the first UE may receive an indication indicating support for a direct NTN communication. For example, 1502 may be performed by direct NTN component 198 of apparatus 1704. The first UE may receive the indication indicating the support for the direct NTN communication from a network entity. The direct NTN communication may be between the first UE and at least a second UE may bypass ground-based feeder links. In some aspects, the indication includes information associated with at least one of a reachable area for the direct NTN communication, supported services for the direct NTN communication, or supported quality of service (QoS) flows over for direct NTN communication. In some aspects, the indication indicating the support for the direct NTN communication may be received via at least one of a SIB, RRC signaling, or media access control (MAC) control element (CE) (MAC-CE).

At 1504, the first UE may transmit a communication request for the direct NTN communication with at least the second UE based on the indication indicating the support for the direct NTN communication. For example, 1504 may be performed by direct NTN component 198 of apparatus 1704. The first UE may transmit the communication request for the direct NTN communication to the network entity. The communication request may be transmitted to at least the second UE via the direct NTN communication. In some aspects, the communication request may comprise information used to identify at least one of the first UE or at least the second UE. In some aspects, the communication request or a communication request feedback message between the first UE and at least the second UE may be transmitted or received via a Uu interface.

FIG. 16 is a flowchart 1600 of a method of wireless communication. The method may be performed by a UE (e.g., the UE 104; the apparatus 1704). One or more of the illustrated operations may be omitted, transposed, or contemporaneous. The method may allow a UE to determine if an intended communication peer UE is reachable over a direct NTN communication.

At 1602, the first UE may receive a configuration comprising location information of at least a second UE. For example, 1602 may be performed by direct NTN component 198 of apparatus 1704. The first UE may receive the configuration comprising location information of at least the second UE from a network entity. In some aspects, the location information may comprise at least one of an area for a location of at least the second UE, updated location information of at least the second UE, a communication range for communication with at least the second UE, or at least one reachable area for the direct NTN communication.

At 1604, the first UE may receive an indication indicating support for a direct NTN communication. For example, 1604 may be performed by direct NTN component 198 of apparatus 1704. The first UE may receive the indication indicating the support for the direct NTN communication from a network entity. The direct NTN communication between the first UE and at least a second UE may bypass ground-based feeder links. In some aspects, the indication includes information associated with at least one of a reachable area for the direct NTN communication, supported services for the direct NTN communication, or supported QoS flows over for direct NTN communication. In some aspects, the indication indicating the support for the direct NTN communication may be received via at least one of a SIB, RRC signaling, or MAC-CE.

At 1606, the first UE may determine whether at least the second UE is reachable for transmission of the communication request. For example, 1606 may be performed by direct NTN component 198 of apparatus 1704. The first UE may determine whether at least the second UE is reachable for transmission of the communication request based on the indication that the network entity supports the direct NTN communication. In some aspects, a determination of whether the second UE is reachable may be based on at least one of a first location of the first UE, a second location of at least the second UE, a communication range, an area for the location of the first UE, a service associated with a link between the first UE and at least the second UE, or a QoS of the service associated with the link between the first UE and at least the second UE.

At 1608, the first UE may transmit a communication request for the direct NTN communication with at least the second UE based on the indication indicating the support for the direct NTN communication. For example, 1608 may be performed by direct NTN component 198 of apparatus 1704. The first UE may transmit the communication request for the direct NTN communication to the network entity. The communication request may be transmitted to at least the second UE via the direct NTN communication. In some aspects, the communication request may comprise information used to identify at least one of the first UE and at least the second UE. In some aspects, the communication request or a communication request feedback message between the first UE and at least the second UE may be transmitted or received via a Uu interface.

At 1610, the first UE may receive a communication request feedback message. For example, 1610 may be performed by direct NTN component 198 of apparatus 1704. The first UE may receive the communication request feedback message from at least the second UE. The communication request feedback message may indicate that at least the second UE is reachable over the direct NTN communication. The communication request feedback message may be received from the second UE via the direct NTN communication.

Figure 17:
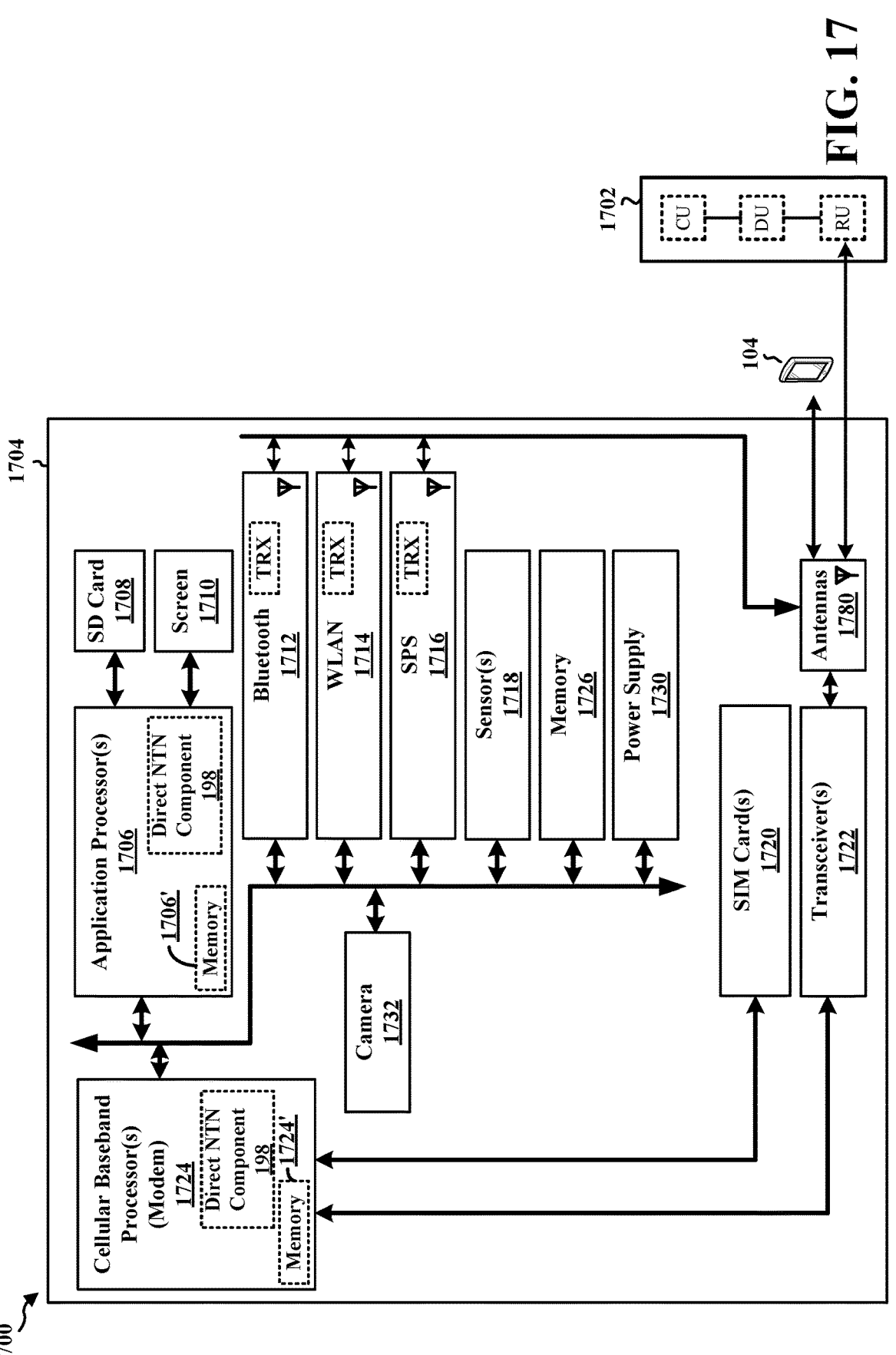
FIG. 17 is a diagram illustrating an example of a hardware implementation for an example apparatus and/or network entity.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include at least one cellular baseband processor 1724 (also referred to as a modem) coupled to one or more transceivers 1722 (e.g., cellular RF transceiver). The cellular baseband processor(s) 1724 may include at least one on-chip memory 1724'. In some aspects, the apparatus 1704 may further include one or more subscriber identity modules (SIM) cards 1720 and at least one application processor 1706 coupled to a secure digital (SD) card 1708 and a screen 1710. The application processor(s) 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor(s) 1724 communicates through the transceiver(s) 1722 via one or more antennas 1780 with the UE 104 and/or with an RU associated with a network entity 1702. The cellular baseband processor(s) 1724 and the application processor(s) 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor(s) 1724 and the application processor(s) 1706 are each responsible for general processing, including the execution of software stored on the computer-readable medium/memory. The software, when executed by the cellular baseband processor(s) 1724/application processor(s) 1706, causes the cellular baseband processor(s) 1724/application processor(s) 1706 to perform the various functions described supra. The computer-readable medium/memory may also be used for storing data that is manipulated by the cellular baseband processor(s) 1724/application processor(s) 1706 when executing software. The cellular baseband processor(s) 1724/application processor(s) 1706 may be a component of the UE 350 and may include the at least one memory 360 and/or at least one of the TX processor 368, the RX processor 356, and the controller/processor 359. In one configuration, the apparatus 1704 may be at least one processor chip (modem and/or application) and include just the cellular baseband processor(s) 1724 and/or the application processor(s) 1706, and in another configuration, the apparatus 1704 may be the entire UE (e.g., see UE 350 of FIG. 3) and include the additional modules of the apparatus 1704.

As discussed supra, the component 198 may be configured to receive, from a network entity, an indication indicating support for a direct NTN communication, wherein the direct NTN communication between the first UE and at least a second UE bypasses ground-based feeder links; and transmit, to the network entity, a communication request for the direct NTN communication with at least the second UE based on the indication indicating the support for the direct NTN communication, wherein the communication request is transmitted to at least the second UE via the direct NTN communication. The component 198 may be within the cellular baseband processor(s) 1724, the application processor(s) 1706, or both the cellular baseband processor(s) 1724 and the application processor(s) 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1704 may include a variety of components configured for various functions. In one configuration, the apparatus 1704, and in particular the cellular baseband processor(s) 1724 and/or the application processor(s) 1706, may include means for receiving, from a network entity, an indication indicating support for a direct NTN communication. The direct NTN communication between the first UE and at least a second UE bypasses ground-based feeder links. The apparatus includes means for transmitting, to the network entity, a communication request for the direct NTN communication with at least the second UE based on the indication indicating the support for the direct NTN communication. The communication request is transmitted to at least the second UE via the direct NTN communication. The apparatus further includes means for determining whether at least the second UE is reachable for transmission of the communication request based on the indication that the network entity supports the direct NTN communication. The apparatus further includes means for receiving, from the second UE, a communication request feedback message indicating that at least the second UE is reachable over the direct NTN communication. The communication request feedback message is received from the second UE via the direct NTN communication. The apparatus further includes means for receiving a configuration comprising location information of at least the second UE. The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

FIG. 18 is a flowchart 1800 of a method of wireless communication. The method may be performed by a base station (e.g., the base station 102; the network entity 1702, 2002). One or more of the illustrated operations may be omitted, transposed, or contemporaneous. The method may configure a UE to determine if an intended communication peer UE is reachable over a direct NTN communication.

At 1802, the first network entity may provide an indication indicating support for a direct NTN communication. For example, 1802 may be performed by direct NTN component 199 of network entity 2002. The first network entity may provide the indication indicating the support for the direct NTN communication to a first UE. The direct NTN communication may be between the first UE and at least a second UE may bypass ground-based feeder links. In some aspects, the indication includes information associated with at least one of a reachable area for the direct NTN communication, supported services for the direct NTN communication, or supported QoS flows over for direct NTN communication. In some aspects, the indication indicating the support for the direct NTN communication may be provided via at least one of a SIB, RRC signaling, or MAC-CE.

At 1804, the first network entity may obtain a communication request for the direct NTN communication with at least the second UE based on the indication indicating the support for the direct NTN communication. For example, 1804 may be performed by direct NTN component 199 of network entity 2002. The first network entity may obtain the communication request for the direct NTN communication from the first UE. The communication request may be communicated via the direct NTN communication. In some aspects, the communication request may comprise information used to identify at least one of the first UE or at least the second UE. In some aspects, the communication request or a communication request feedback message between the first UE and at least the second UE may be provided or obtained via a Uu interface.

Figure 19:
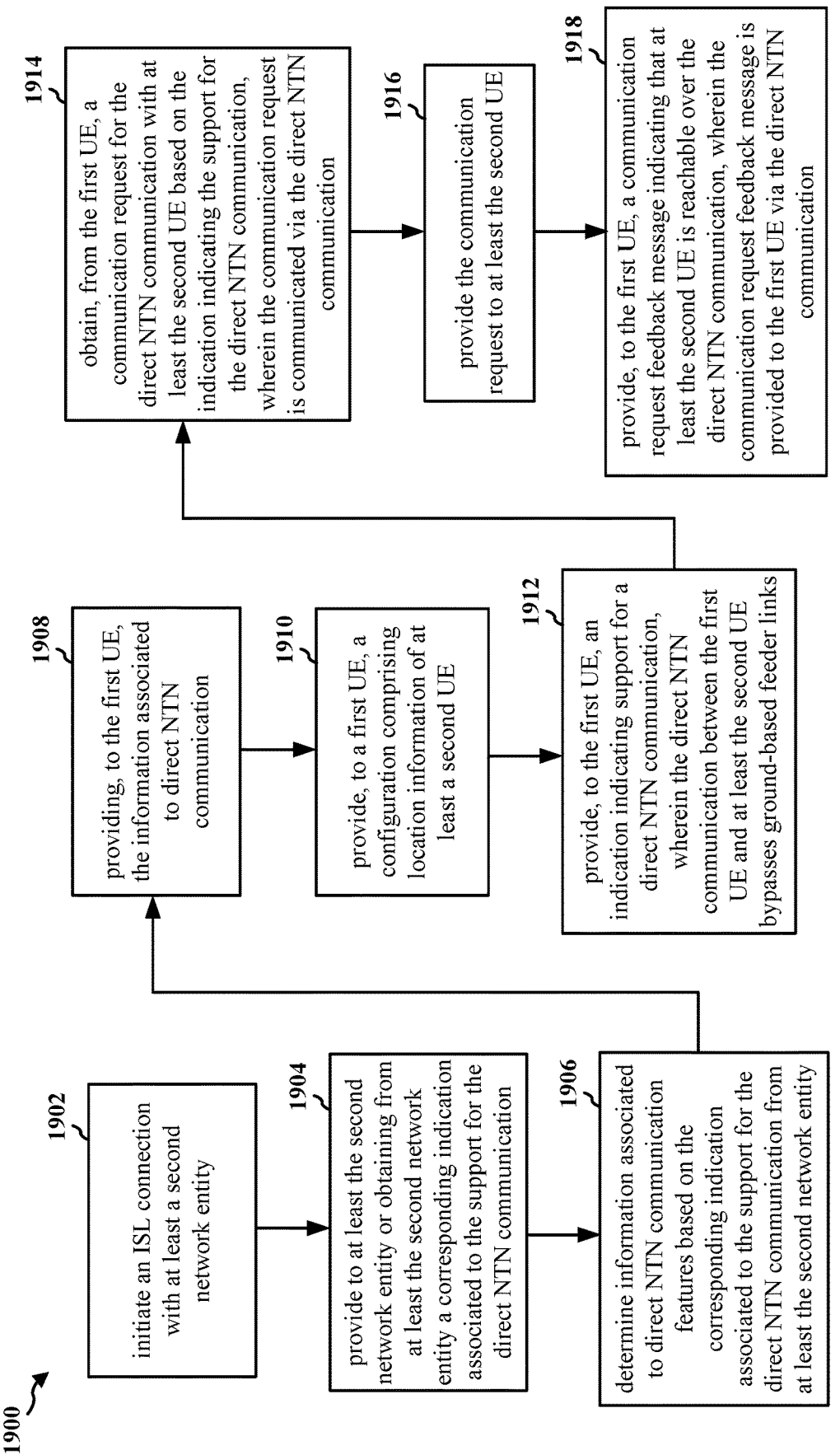
FIG. 19 is a flowchart of a method of wireless communication.

FIG. 19 is a flowchart 1900 of a method of wireless communication. The method may be performed by a base station (e.g., the base station 102; the network entity 1702, 2002). One or more of the illustrated operations may be omitted, transposed, or contemporaneous. The method may configure a UE to determine if an intended communication peer UE is reachable over a direct NTN communication.

At 1902, the first network entity may initiate an ISL connection. For example, 1902 may be performed by direct NTN component 199 of network entity 2002. The first network entity may initiate the ISL connection with at least a second network entity. In some aspects, each of the first network entity and at least the second network entity comprise a satellite. The satellite may operate as a NTN network node.

At 1904, the first network entity may provide or obtain an indication associated to the support for the direct NTN communication. For example, 1904 may be performed by direct NTN component 199 of network entity 2002. The first network entity may provide the indication associated to the support for the direct NTN communication to at least the second network entity. The first network entity may obtain the indication associated to the support for the direct NTN communication from at least the second network entity.

At 1906, the first network entity may determine information associated to direct NTN communication features. For example, 1906 may be performed by direct NTN component 199 of network entity 2002. The first network entity may determine the information associated to the direct NTN communication features based on the corresponding indication associated to the support for the direct NTN communication from at least the second network entity.

At 1908, the first network entity may provide the information associated to the direct NTN communication. For example, 1908 may be performed by direct NTN component 199 of network entity 2002. The first network entity may provide the information associated to the direct NTN communication to the first UE.

At 1910, the first network entity may provide a configuration comprising location information of at least the second UE. For example, 1910 may be performed by direct NTN component 199 of network entity 2002. The first network entity may provide the configuration comprising the location information of at least the second UE to the first UE. In some aspects, the location information may comprise at least one of an area for a location of at least the second UE, updated location information of at least the second UE, a communication range for communication with at least the second UE, or at least one reachable area for the direct NTN communication.

At 1912, the first network entity may provide an indication indicating support for a direct NTN communication. For example, 1912 may be performed by direct NTN component 199 of network entity 2002. The first network entity may provide the indication indicating the support for the direct NTN communication to the first UE. The direct NTN communication may be between the first UE and at least the second UE may bypass ground-based feeder links. In some aspects, the indication includes information associated with at least one of a reachable area for the direct NTN communication, supported services for the direct NTN communication, or supported QoS flows over for direct NTN communication. In some aspects, the indication indicating the support for the direct NTN communication may be provided via at least one of a SIB, RRC signaling, or MAC-CE.

At 1914, the first network entity may obtain a communication request for the direct NTN communication with at least the second UE based on the indication indicating the support for the direct NTN communication. For example, 1914 may be performed by direct NTN component 199 of network entity 2002. The first network entity may obtain the communication request for the direct NTN communication from the first UE. The communication request may be communicated via the direct NTN communication. In some aspects, the communication request may comprise information used to identify at least one of the first UE or at least the second UE. In some aspects, the communication request or a communication request feedback message between the first UE and at least the second UE may be provided or obtained via a Uu interface.

At 1916, the first network entity may provide the communication request to at least the second UE. For example, 1916 may be performed by direct NTN component 199 of network entity 2002. In some aspects, the communication request provided to at least the second UE may comprise a modified communication request. The modified communication request may be modified by the first network entity. For example, the modified communication request may be modified by the network entity prior to providing the communication request to at least the second UE. The modified communication request may comprise additional information used for at least the second UE to send a feedback message.

At 1918, the first network entity may provide a communication request feedback message indicating that at least the second UE may be reachable over the direct NTN communication. For example, 1918 may be performed by direct NTN component 199 of network entity 2002. The first network entity may provide the communication request feedback message to the first UE. The first network entity may provide the communication request feedback message to the first UE in response to obtaining the communication request feedback message from at least the second UE.

Figure 20:
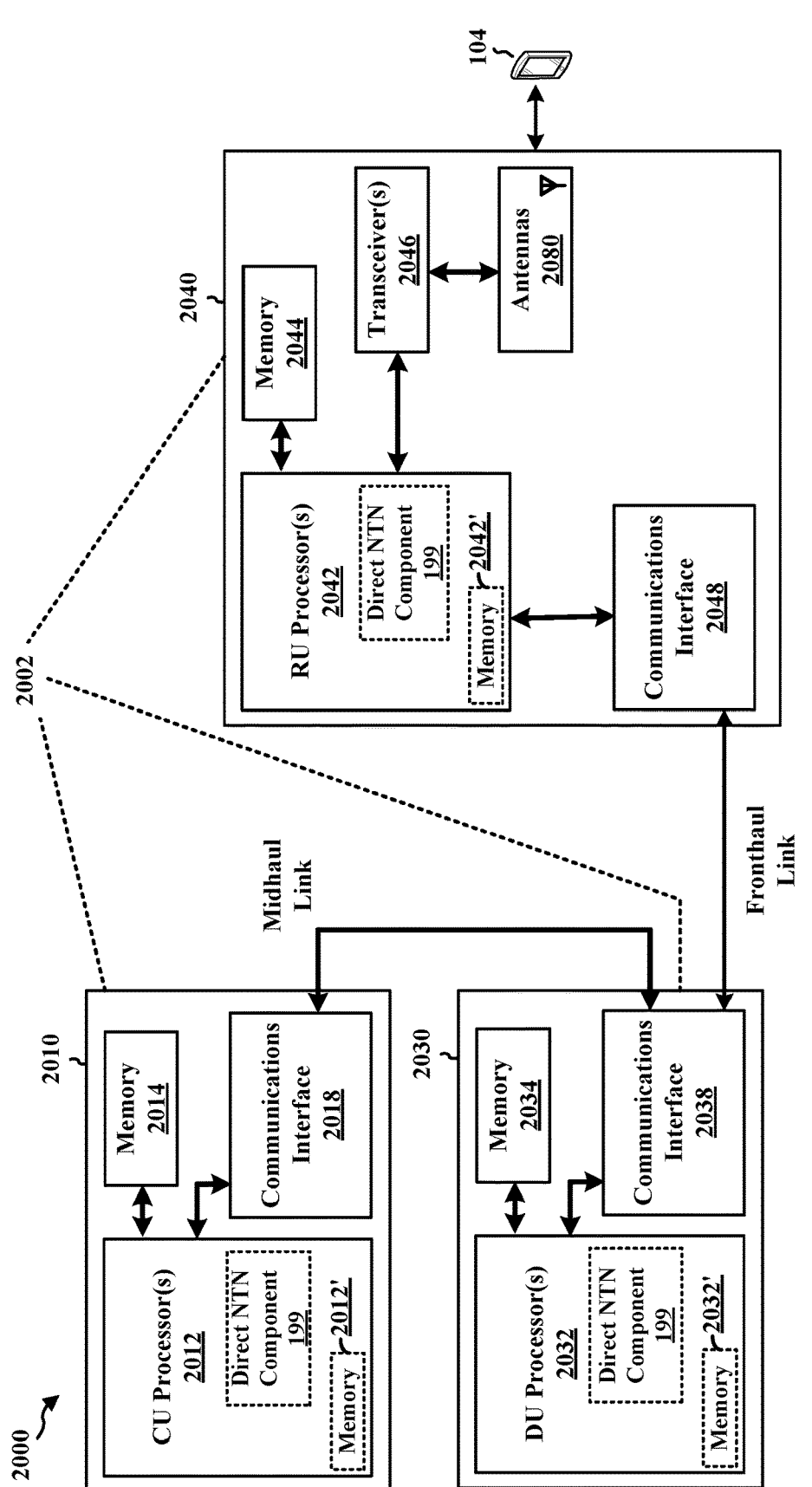
FIG. 20 is a diagram illustrating an example of a hardware implementation for an example network entity.

FIG. 20 is a diagram 2000 illustrating an example of a hardware implementation for a network entity 2002. The network entity 2002 may be a BS, a component of a BS, or may implement BS functionality. The network entity 2002 may include at least one of a CU 2010, a DU 2030, or an RU 2040. For example, depending on the layer functionality handled by the component 199, the network entity 2002 may include the CU 2010; both the CU 2010 and the DU 2030; each of the CU 2010, the DU 2030, and the RU 2040; the DU 2030; both the DU 2030 and the RU 2040; or the RU 2040. The CU 2010 may include at least one CU processor 2012. The CU processor(s) 2012 may include on-chip memory 2012'. In some aspects, the CU 2010 may further include additional memory modules 2014 and a communications interface 2018. The CU 2010 communicates with the DU 2030 through a midhaul link, such as an F1 interface. The DU 2030 may include at least one DU processor 2032. The DU processor(s) 2032 may include on-chip memory 2032'. In some aspects, the DU 2030 may further include additional memory modules 2034 and a communications interface 2038. The DU 2030 communicates with the RU 2040 through a fronthaul link. The RU 2040 may include at least one RU processor 2042. The RU processor(s) 2042 may include on-chip memory 2042'. In some aspects, the RU 2040 may further include additional memory modules 2044, one or more transceivers 2046, antennas 2080, and a communications interface 2048. The RU 2040 communicates with the UE 104. The on-chip memory 2012', 2032', 2042' and the additional memory modules 2014, 2034, 2044 may each be considered a computer-readable medium/memory. Each computer-readable medium/memory may be non-transitory. Each of the processors 2012, 2032, 2042 is responsible for general processing, including the execution of software stored on the computer-readable medium/memory. The software, when executed by the corresponding processor(s) causes the processor(s) to perform the various functions described supra. The computer-readable medium/ memory may also be used for storing data that is manipulated by the processor(s) when executing software.

As discussed supra, the component 199 may be configured to provide, to a first UE, an indication indicating support for a direct NTN communication, wherein the direct NTN communication between the first UE and at least a second UE bypasses ground-based feeder links; and obtain, from the first UE, a communication request for the direct NTN communication with at least the second UE based on the indication indicating the support for the direct NTN communication, wherein the communication request is communicated via the direct NTN communication. The component 199 may be within one or more processors of one or more of the CU 2010, DU 2030, and the RU 2040. The component 199 may be one or more hardware components specifically configured to carry out the stated processes/ algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2002 may include a variety of components configured for various functions. In one configuration, the network entity 2002 may include means for providing, to a first UE, an indication indicating support for a direct NTN communication. The direct NTN communication between the first UE and at least a second UE bypasses ground-based feeder links. The network entity includes means for obtaining, from the first UE, a communication request for the direct NTN communication with at least the second UE based on the indication indicating the support for the direct NTN communication. The communication request is communicated via the direct NTN communication. The network entity further includes means for providing, to the first UE, a communication request feedback message indicating that the second UE is reachable over the direct NTN communication. The communication request feedback message is provided to the first UE via the direct NTN communication. The network entity further includes means for providing, to the first UE, a configuration comprising location information of the second UE. The network entity further includes means for providing the communication request to at least the second UE. The network entity further includes means for initiating an ISL connection with at least a second network entity. The network entity further includes means for providing to at least the second network entity or obtaining from at least the second network entity a corresponding indication associated to the support for the direct NTN communication. The network entity further includes means for determining information associated to direct NTN communication features based on the corresponding indication associated to the support for the direct NTN communication from at least the second network entity. The network entity further includes means for providing, to the first UE, the information associated to the direct NTN communication. The means may be the component 199 of the network entity 2002 configured to perform the functions recited by the means. As described supra, the network entity 2002 may include the TX processor 316, the RX processor 370, and the controller/processor 375. As such, in one configuration, the means may be the TX processor 316, the RX processor 370, and/or the controller/ processor 375 configured to perform the functions recited by the means.

Aspects presented herein provide a configuration for an initial end-to-end discovery procedure in direct NTN communication. Aspects presented herein may allow an initiating UE to determine whether peer UE(s) are reachable over the considered direct NTN communication system, without requesting for a central function/database at an NTN node. At least one advantage of the disclosure is that signaling overhead may be reduced and may improve system capacity based at least on a lack of using a central function/database at a moving NTN node (e.g., aerial device, satellite). At least another advantage of the disclosure is that an initiating UE and/or peer UE may reduce their power consumption based only performing the direct NTN communication when it wants to communicate with the peer UE/initiating UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only. A and B, A and C. B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first UE comprising receiving, from a network entity, an indication indicating support for a direct NTN communication, wherein the direct NTN communication between the first UE and at least a second UE bypasses ground-based feeder links; and transmitting, to the network entity, a communication request for the direct NTN communication with at least the second UE based on the indication indicating support for the direct NTN communication, wherein the communication request is transmitted to the second UE via the direct NTN communication.

Aspect 2 is the method of aspect 1, further includes that the indication includes information associated with at least one of a reachable area for the direct NTN communication; supported services for the direct NTN communication; or supported QoS flows over for direct NTN communication.

Aspect 3 is the method of any of aspects 1 and 2, further including determining whether at least the second UE is reachable for transmission of the communication request based on the indication that the network entity supports the direct NTN communication.

Aspect 4 is the method of any of aspects 1-3, further includes that determining whether the second UE is reachable is based on at least one of a first location of the first UE; a second location of the second UE; a communication range; an area for the location of the first UE; a service associated with a link between the first UE and the second UE; or a QoS of the service associated with the link between the first UE and the second UE.

Aspect 5 is the method of any of aspects 1-4, further including receiving, from the second UE, a communication request feedback message indicating that the second UE is reachable over the direct NTN communication, wherein the communication request feedback message is received from the second UE via the direct NTN communication.

Aspect 6 is the method of any of aspects 1-5, further includes that the indication indicating the support for the direct NTN communication is received via at least one of a SIB, RRC signaling, or MAC-CE.

Aspect 7 is the method of any of aspects 1-6, further includes that the communication request comprises information used to identify at least one of the first UE and the second UE.

Aspect 8 is the method of any of aspects 1-7, further includes that the communication request or a communication request feedback message between the first UE and at least the second UE is transmitted or received via a Uu interface.

Aspect 9 is the method of any of aspects 1-8, further including receiving a configuration comprising location information of the second UE.

Aspect 10 is the method of any of aspects 1-9, further includes that the location information comprises at least one of an area for a location of the second UE; updated location information of the second UE; a communication range for communication with the second UE; or at least one reachable area for the direct NTN communication.

Aspect 11 is an apparatus for wireless communication at a first UE including at least one processor coupled to a memory and at least one transceiver, the at least one processor configured to implement any of Aspects 1-10.

Aspect 12 is an apparatus for wireless communication at a first UE including means for implementing any of Aspects 1-10.

Aspect 13 is a computer-readable medium storing computer executable code, where the code when executed by a processor causes the processor to implement any of Aspects 1-10.

Aspect 14 is a method of wireless communication at a first network entity comprising providing, to a first UE, an indication indicating support for a direct NTN communication, wherein the direct NTN communication between the first UE and at least a second UE bypasses ground-based feeder links; and obtaining, from the first UE, a communication request for the direct NTN communication with at least the second UE based on the indication indicating support for the direct NTN communication, wherein the communication request is communicated via the direct NTN communication.

Aspect 15 is the method of aspect 14, further includes that the indication includes information associated with at least one of a reachable area for the direct NTN communication; supported services for the direct NTN communication; or supported QoS flows over for direct NTN communication.

Aspect 16 is the method of any of aspects 14 and 15, further including providing, to the first UE, a communication request feedback message indicating that the second UE is reachable over the direct NTN communication, wherein the communication request feedback message is provided to the first UE via the direct NTN communication.

Aspect 17 is the method of any of aspects 14-16, further includes that the communication request feedback message is provided to the first UE based on obtaining the communication request feedback message from the second UE.

Aspect 18 is the method of any of aspects 14-17, further includes that the indication indicating the support for a direct NTN communication is provided via at least one of a SIB, RRC signaling, or MAC-CE.

Aspect 19 is the method of any of aspects 14-18, further includes that the communication request comprises information used to identify at least one of the first UE and the second UE.

Aspect 20 is the method of any of aspects 14-19, further includes that the communication request or a communication request feedback message between the first UE and at least the second UE is provided or obtained via a Uu interface.

Aspect 21 is the method of any of aspects 14-20, further including providing, to the first UE, a configuration comprising location information of the second UE.

Aspect 22 is the method of any of aspects 14-21, further includes that the location information comprises at least one of an area for a location of the second UE; updated location information of the second UE; a communication range for communication with the second UE; or at least one reachable area for the direct NTN communication.

Aspect 23 is the method of any of aspects 14-22, further including providing the communication request to at least the second UE.

Aspect 24 is the method of any of aspects 14-23, further includes that the communication request provided to at least the second UE comprises a modified communication request, wherein the modified communication request is modified by the first network entity.

Aspect 25 is the method of any of aspects 14-24, further including initiating an ISL connection with at least a second network entity; providing to at least the second network entity or obtaining from at least the second network entity a corresponding indication associated to the support for the direct NTN communication; determining information associated to direct NTN communication features based on the corresponding indication associated to the support for the direct NTN communication from the at least the second network entity; and providing, to the first UE, the information associated to direct NTN communication.

Aspect 26 is an apparatus for wireless communication at a first network entity including at least one processor coupled to a memory and at least one transceiver, the at least one processor configured to implement any of Aspects 14-25.

Aspect 27 is an apparatus for wireless communication at a first network entity including means for implementing any of Aspects 14-25.

Aspect 28 is a computer-readable medium storing computer executable code, where the code when executed by a processor causes the processor to implement any of Aspects 14-25.

What is claimed is:
1. An apparatus for wireless communication at a first user equipment (UE), comprising:
at least one memory; and
at least one processor coupled to the at least one memory and, based at least in part on information stored in the at least one memory, the at least one processor is configured to:
receive, from a network entity, an indication indicating support for a direct non-terrestrial network (NTN) communication, wherein the direct NTN communication between the first UE and at least a second UE bypasses ground-based feeder links; and transmit, to the network entity, a communication request for the direct NTN communication with at least the second UE based on the indication indicating support for the direct NTN communication, wherein the communication request is transmitted to the second UE via the direct NTN communication.

2. The apparatus of claim 1, wherein the indication includes information associated with at least one of:

a reachable area for the direct NTN communication;

supported services for the direct NTN communication; or supported quality of service (QOS) flows over for direct NTN communication.

3. The apparatus of claim 1, wherein the at least one processor is configured to:

determine whether at least the second UE is reachable for transmission of the communication request based on the indication that the network entity supports the direct NTN communication.

4. The apparatus of claim 3, wherein to determine whether the second UE is reachable, the at least one processor is configured to determine whether the second UE is reachable based on at least one of:

a first location of the first UE, a second location of the second UE;

a communication range;

an area for the location of the first UE;

a service associated with a link between the first UE and the second UE; or a quality of service (QoS) of the service associated with the link between the first UE and the second UE.

5. The apparatus of claim 1, wherein the at least one processor is configured to:

receive, from the second UE, a communication request feedback message indicating that the second UE is reachable over the direct NTN communication, wherein the communication request feedback message is received from the second UE via the direct NTN communication.

6. The apparatus of claim 1, wherein to receive the indication indicating the support for the direct NTN communication, the at least one processor is configured to receive the indication indicating the support for the direct NTN communication via at least one of a system information block (SIB), radio resource control (RRC) signaling, or media access control (MAC) control element (CE) (MAC-CE).

7. The apparatus of claim 1, wherein the communication request comprises information used to identify at least one of the first UE and the second UE.

8. The apparatus of claim 1, wherein to transmit or receive the communication request or a communication request feedback message between the first UE and at least the second UE, the at least one processor is configured to transmit or receive the communication request or a communication request feedback message between the first UE and at least the second UE via a Uu interface.

9. The apparatus of claim 1, wherein the at least one processor is configured to:

receive a configuration comprising location information of the second UE.

10. The apparatus of claim 9, wherein the location information comprises at least one of:

an area for a location of the second UE;

updated location information of the second UE;

a communication range for communication with the second UE; or at least one reachable area for the direct NTN communication.

11. A method of wireless communication at a first user equipment (UE), comprising:

receiving, from a network entity, an indication indicating support for a direct non-terrestrial network (NTN) communication, wherein the direct NTN communication between the first UE and at least a second UE bypasses ground-based feeder links; and transmitting, to the network entity, a communication request for the direct NTN communication with at least the second UE based on the indication indicating support for the direct NTN communication, wherein the communication request is transmitted to at least the second UE via the direct NTN communication.

12. The method of claim 11, further comprising:

determining whether at least the second UE is reachable for transmission of the communication request based on the indication that the network entity supports the direct NTN communication.

13. The method of claim 11, further comprising:

receiving, from the second UE, a communication request feedback message indicating that the second UE is reachable over the direct NTN communication, wherein the communication request feedback message is received from the second UE via the direct NTN communication.

14. An apparatus for wireless communication at a first network entity, comprising:

at least one memory; and at least one processor coupled to the at least one memory and, based at least in part on information stored in the at least one memory, the at least one processor, individually or in any combination, is configured to:

provide, to a first user equipment (UE), an indication indicating support for a direct non-terrestrial network (NTN) communication, wherein the direct NTN communication between the first UE and at least a second UE bypasses ground-based feeder links; and obtain, from the first UE, a communication request for the direct NTN communication with at least the second UE based on the indication indicating support for the direct NTN communication, wherein the communication request is communicated via the direct NTN communication.

15. The apparatus of claim 14, wherein the indication includes information associated with at least one of:

a reachable area for the direct NTN communication;

supported services for the direct NTN communication; or supported quality of service (QOS) flows over for direct NTN communication.

16. The apparatus of claim 14, wherein the at least one processor is configured to:

provide, to the first UE, a communication request feedback message indicating that the second UE is reachable over the direct NTN communication, wherein the communication request feedback message is provided to the first UE via the direct NTN communication.

17. The apparatus of claim 16, wherein to provide the communication request feedback message to the first UE, the at least one processor is configured to provide the communication request feedback message to the first UE based on obtaining the communication request feedback message from the second UE.

18. The apparatus of claim 14, wherein to provide the indication indicating the support for the direct NTN communication, the at least one processor is configured to provide the indication indicating the support for the direct NTN communication via at least one of a system information block (SIB), radio resource control (RRC) signaling, or media access control (MAC) control element (CE) (MAC-CE).

19. The apparatus of claim 14, wherein the communication request comprises information used to identify at least one of the first UE and the second UE.

20. The apparatus of claim 14, wherein to provide or obtain the communication request or a communication request feedback message between the first UE and at least the second UE, the at least one processor is configured to provide or obtain the communication request or a communication request feedback message between the first UE and at least the second UE via a Uu interface.

21. The apparatus of claim 14, wherein the at least one processor is configured to: provide, to the first UE, a configuration comprising location information of the second UE.

22. The apparatus of claim 21, wherein the location information comprises at least one of:

an area for a location of the second UE;

updated location information of the second UE;

a communication range for communication with the second UE; or at least one reachable area for the direct NTN communication.

23. The apparatus of claim 14, wherein the at least one processor is configured to:

provide the communication request to at least the second UE.

24. The apparatus of claim 23, wherein the communication request provided to at least the second UE comprises a modified communication request, wherein the modified communication request is modified by the first network entity.

25. The apparatus of claim 14, wherein the at least one processor is configured to:

initiate an inter-satellite link (ISL) connection with at least a second network entity;

provide to at least the second network entity or obtaining from at least the second network entity a corresponding indication associated to the support for the direct NTN communication;

determine information associated to direct NTN communication features based on the corresponding indication associated to the support for the direct NTN communication from the at least the second network entity; and provide, to the first UE, the information associated to direct NTN communication.

26. A method of wireless communication at a first network entity, comprising:

providing, to a first user equipment (UE), an indication indicating support for a direct non-terrestrial network (NTN) communication, wherein the direct NTN communication between the first UE and at least a second UE bypasses ground-based feeder links; and obtaining, from the first UE, a communication request for the direct NTN communication with at least the second UE based on the indication indicating support for the direct NTN communication, wherein the communication request is communicated via the direct NTN communication.

27. The method of claim 26, further comprising:

providing, to the first UE, a communication request feedback message indicating that the second UE is reachable over the direct NTN communication, wherein the communication request feedback message is provided to the first UE via the direct NTN communication.

28. The method of claim 26, further comprising:

initiating an inter-satellite link (ISL) connection with at least a second network entity;

providing to at least the second network entity or obtaining from at least the second network entity a corresponding indication associated to the support for the direct NTN communication;

determining information associated to direct NTN communication features based on the corresponding indication associated to the support for the direct NTN communication from at least the second network entity; and providing, to the first UE, the information associated to direct NTN communication.

* * * * *